ELECTRONIC DIGITAL COMPUTING DEVICES

Filed April 11, 1951 8 Sheets-Sheet 1

| BEAT NO | IN STORE DS | SIGNAL TO GATE RG | SIGNAL THROUGH GATE 21 | IN ACCUMULATOR A | SIGNAL THROUGH GATE 24 |
|---|---|---|---|---|---|
| A2 | 10101000...0 | 10101000..0<br>11001000..0 | 10101000...0 | 10101000 0 | 1001000...0 |
| A3 | 01010100...0 | 01010100..0<br>11001000..0 | 01010100...0 | 11111100...0 | 001000 ... 0 |
| A4 | 00101010...0 | 00101010..0<br>11001000..0 | - | 11111100...0 | 01 000 ... 0 |
| A5 | 000101010 - 0 | 00010101..0<br>11001000..0 | - | 11111100...0 | 10000 ... 0 |
| An | 0000101011.. 0 | 0000101...0<br>1100 1000...0 | 0000101010..0 | 111100010..0 | 00000 ... 0 |

INVENTOR:
TOM KILBURN
ATTORNEYS:
Morrie and Hall

March 26, 1957 T. KILBURN 2,786,628

ELECTRONIC DIGITAL COMPUTING DEVICES

Filed April 11, 1951 8 Sheets-Sheet 2

INVENTOR:
TOM KILBURN
ATTORNEYS:
Moore and Hall

INVENTOR:
TOM KILBURN
Stevens, Davis, Miller & Mosher
Attorneys

INVENTOR:
TOM KILBURN
Stevens, Davis, Miller & Mosher
Attorneys

March 26, 1957 T. KILBURN 2,786,628
ELECTRONIC DIGITAL COMPUTING DEVICES
Filed April 11, 1951 8 Sheets-Sheet 5

INVENTOR:
TOM KILBURN

Stevens, Davis, Miller & Mosher
Attorneys

ELECTRONIC DIGITAL COMPUTING DEVICES

Filed April 11, 1951 8 Sheets-Sheet 6

INVENTOR:
TOM KILBURN

Stevens, Davis, Miller & Mosher
Attorneys

INVENTOR:
TOM KILBURN

Stevens, Davis, Miller & Mosher
Attorneys

March 26, 1957 T. KILBURN 2,786,628

ELECTRONIC DIGITAL COMPUTING DEVICES

Filed April 11, 1951 8 Sheets-Sheet 8

INVENTOR:
TOM KILBURN

Stevens, Davis, Miller & Mosher
Attorneys 2,786,628

ELECTRONIC DIGITAL COMPUTING DEVICES

Tom Kilburn, Davyhulme, Manchester, England, assignor to National Research Development Corporation, London, England, a corporation of Great Britain Application April 11, 1951, Serial No. 220,466

Claims priority, application Great Britain April 13, 1950

12 Claims. (Cl. 235—61)

This invention relates to multiplying arrangements for use with electronic digital computing machines of the type which operates with binary numbers expressed dynamically in serial form as trains of electrical pulse signals.

The process of multiplication in the binary scale can be resolved into the repeated addition in an accumulator device, of versions of the multiplicand multiplied by those powers of 2 which correspond to the "1" digits present in the multiplier. A multiplying device for binary-digital numbers operating in such a fashion has been described in U. S. A. Patent No. 2,404,047 to L. E. Flory et al. entitled "Electronic Computing Device."

The process of multiplication may also be carried out in a direct manner by a universal digital computing machine, each step of the process being executed as a separate operation by the machine, and in the simplest case being controlled by a separate instruction which is obeyed by the machine. An example of such a universal digital computing machine is described in the article by T. Kilburn entitled "The University of Manchester Universal High-Speed Digital Computing Machine," published in Nature, October 22, 1949, pages 684–687. In such a machine each number transference from a source to a destination (which may also involve an elementary arithmetical operation such as addition) is controlled by an instruction which is normally held in coded form in a store within the machine. The selection of instructions normally proceeds sequentially according to a predetermined plan and in order to provide the "universal" feature of the machine arrangements are made for interrupting the instruction-selection process and placing the selection of an instruction at the disposal of the machine itself under the guidance of a test or discriminatory operation. Most simply, if the instructions recorded in the store of the machine are assigned numbers, which can conveniently represent the storage locations occupied by instructions, the normal sequential selection of instructions may proceed upon a basis of the instruction numbers. In the machine described in the aforesaid article by T. Kilburn, a portion of the machine referred to as "Control" is used to effect the instruction selection. Control is a storage device which holds the number (C. I.) of the instruction (P. I.) being currently obeyed and when the obeying of an instruction is completed, as is indicated by the release of a completion signal or "prepulse," unity is normally added to the C. I. content of control to cause selection of the next instruction (P. I.). Interruption of this normal sequential selection process is obtained by inserting, at the appropriate place in the list of instructions fed to the machine, an instruction which causes the machine itself to change the number held in control to a new value so that when the modification of the number in control is completed, operation is transferred to a new place in the list of instructions and proceeds sequentially from there. If transfer of control to the new position is not required by the result of a test or discrimination, carried out by the instruction proceeding that instruction which will effect transfer, then the transfer is avoided by by-passing the transfer instruction. This may be done simply by causing unity to be added to the C. I. number in control in the normal manner following the obeying of a test or discriminatory instruction if transfer is required, but causing not unity but two to be added to the C. I. number in control if the result of the test indicates that transfer of control is not required.

It is the object of the present invention to provide apparatus which may be used as part of a universal digital computing machine to enable the process of multiplication to be carried out in a manner more expeditious than the execution of the multiplication by the machine as a series of separate operations in which each step of the multiplication process is performed under the control of a separate instruction.

The invention provides a separate storage unit in a universal digital computing machine to which a multiplicand D may be fed from the main store of the machine by the normal operational processes of the machine.

During the process of multiplication of the multiplicand by the multiplier R, which is held in the main store of the machine, the numbers D and R are, as the result of a single instruction, repeatedly reconstituted in dynamic form and re-recorded, the number D being delayed by one digit period (equivalent to multiplication by 2) during each reconstitution. The number D is passed to, or withheld from, the accumulator device of the machine at each dynamic reconstitution in dependence upon the value ("1" or "0") of the digit in the multiplier which is coincident in time with the first occurring digit of the multiplicand.

In accordance with a feature of the invention the inspection of the successively later digits of the multiplier R is effected in a gate circuit which is controlled by a digit pulse signal provided by the dynamic reproduction of a "1" digit, which has been added in if necessary, in the least significant digit position in the original number D. If a "1" digit had to be added into the least significant digit position of the multiplicand D in order to provide the moving gate-controlling pulse, the product finally built up in the accumulator of the machine will be in error, if allowance is not made, exceeding the correct value by the multiplier R. In accordance with a further feature of the invention therefore, a storage element is provided which records the presence or absence of a "1" digit in the digital position of least significance of the original number D. The state of this storage element is used either, to provide a discriminatory effect, at the conclusion of the multiplication process outlined, whereby the ordinary processes of machine operation are caused, by use of an appropriate instruction provided in the machine, to apply any correction (subtraction of R) that may be required to cause the content of the machine accumulator to assume the correct value of the product, or to prevent any "1" digit which has been added in the least significant digital position of D from being fed to the accumulator device during the multiplication process.

The multiplying arrangements provided by the invention do not automatically take account of the signs of the multiplier and multiplicand and it is necessary for this purpose to rely upon the normal methods available in universal digital computing machines and which will be familiar to those versed in the art of "programming" i. e. the preparation of problems and lists of instructions for such machines. The programming of a multiplication may be so arranged that multiplication always proceeds as if both factors are positive, any correction to take account of a negative product being carried out by specially prepared instructions before or after the completion of the multiplication. Alternatively a negative product may be provided by the use of a subtractor in place of an adder in the machine accumulator, in which case the machine instruction which causes multiplication to occur must be designed to condition the accumulator appropriately and the requisite one of the two possible types of multiplication instruction must then be reached by a transfer of control operation following upon a programme of operations which determines what the sign of the product is to be.

In order that the various features of the invention may be more readily understood it will now be described in greater detail with reference to the accompanying drawings in which:

Fig. 1 is an explanatory timing diagram showing the multiplication process within the machine.

Fig. 2 is a chart illustrating the progression of the multiplicand number and the position of the least significant digit thereof with relation to the multiplier number and the transmission of such multiplicand number to the accumulator at various stages in the multiplication of two simple binary numbers while, Fig. 3 is a schematic block diagram of the apparatus in accordance with one embodiment of the invention shown in association with the principal elements only of an electronic digital computing machine of suitable type and Fig. 4 is a fragmentary schematic view of a modification.

Figure 13:
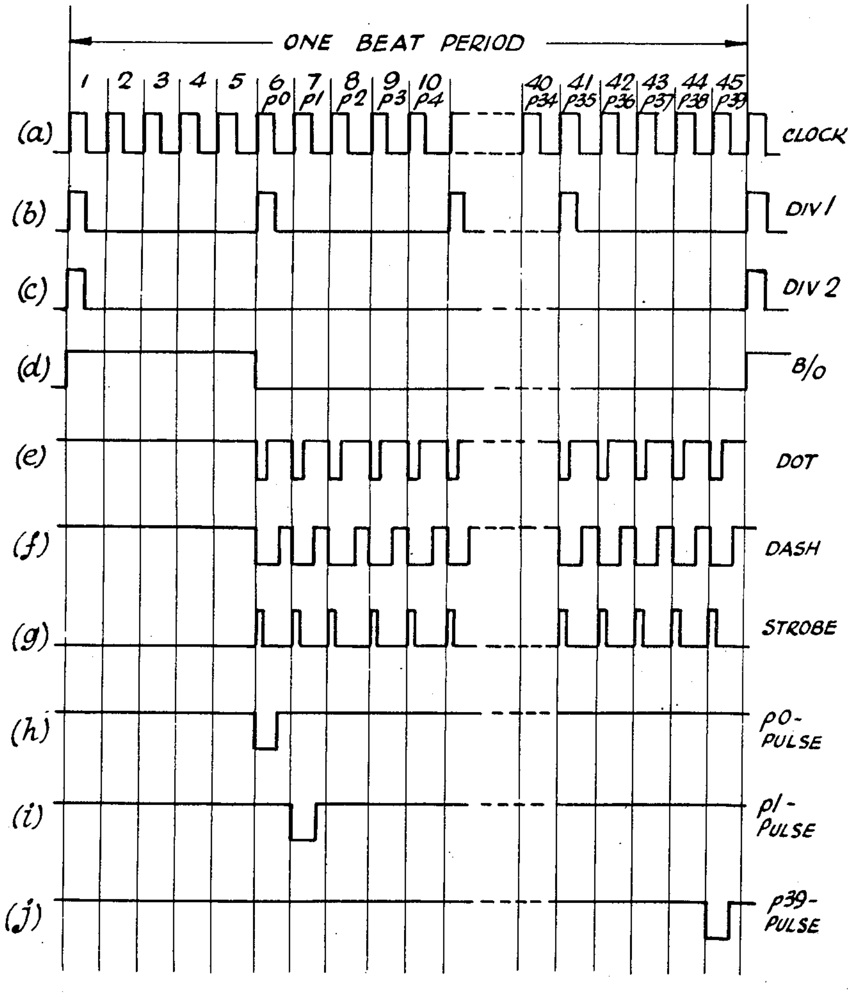
Figure 14:
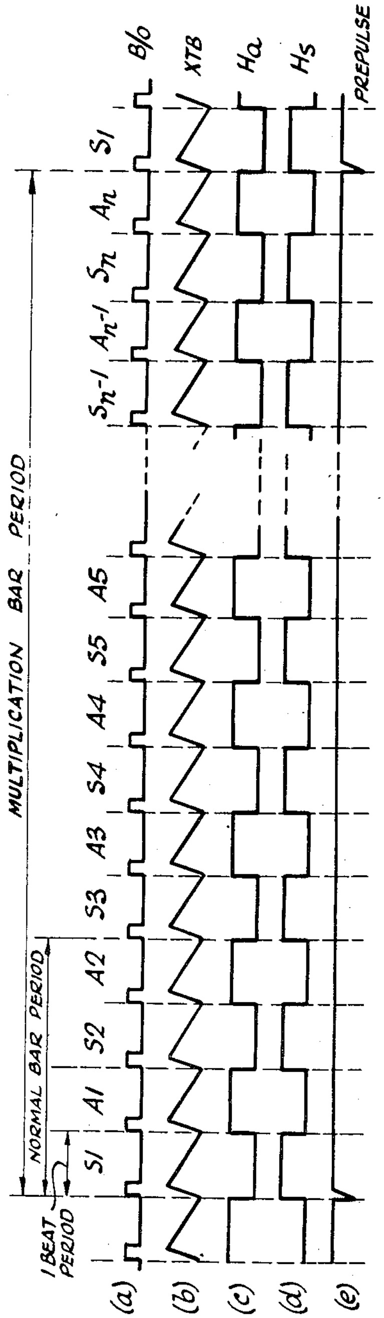

Figs. 13 and 14 each comprise a series of electric waveform diagrams.

Figure 15:
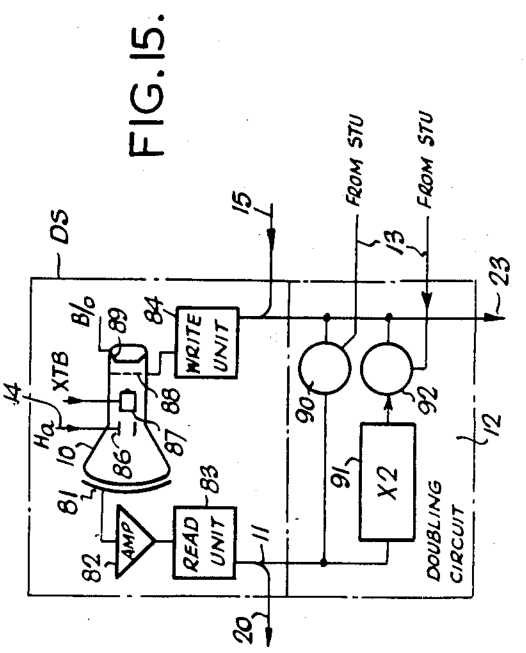

Fig. 15 is a more detailed schematic diagram of the subsidiary store DS.

It will be assumed in the following descriptive example of the invention that a computing machine of the kind described in the aforesaid article by T. Kilburn is employed. This machine employs cathode-ray-tube storage systems of the kind described in the paper by F. C. Williams and T. Kilburn entitled "A Storage System for Use With Binary-Digital Computing Machines," published in the Proceedings of the Institution of Electrical Engineers, London, vol. 96, part III, March 1949, pages 81–100, and operates with a basic rhythm in which a time interval, referred to as a "bar," is occupied by the machine in respect of each separate instruction which is obeyed and each "bar" is initiated by a prepulse signal which is released when the obeying of the proceeding instructions is completed. Each bar comprises a number of "beats" or "minor cycles" which are the time intervals required for the expression in serial dynamic form of single "words" or numbers of normal length. In the normal case, in the machines referred to, a bar comprises four beats. As explained in said paper by F. C. Williams and T. Kilburn, beats or phases are referred to as Scan (S) and Action (A) beats for reasons associated with the operation of the cathode-ray-tube storage systems. Scan and action beats normally occur in alternation.

Although the description which follows is based upon a particular machine embodying a particular cathode ray tube type of digital store it will be obvious that the invention is applicable to any universal machine of the serial type and that any suitable known form of digital storage system may be employed, for example mercury-delay lines, which are capable of continuous reproduction, in serial dynamic form, of recorded information.

In adapting the computing machine for use with the invention, basically two new destinations and corresponding instructions have to be provided for in the organisation of the machine. The two numbers D and R to be multiplied will initially be held in the main store MS of the machine and the first step is to transfer the multiplicand number D from main store MS to a subsidiary storage location DS provided by the invention. This transfer will be effected by normal operation of the machine obeying an instruction which may be designated *s*, D. The actual transfer will occur in the last beat, A2, of a bar, which is indicated as Bar 0 in Fig. 1 which shows, against a time scale of beats and bars, the events of a multiplication process. At the conclusion of Bar 0, a prepulse will be given and the machine may proceed to some operation not directly concerned with the multiplication, the multiplicand D being regenerated unchanged meanwhile in the subsidiary store DS. It will be assumed, however, that the multiplier R is immediately available in the main store MS and that the multiplication process commences during Bar 1. During Bar 1 the machine, by its normal processes, feeds the multiplier number R from the main store MS to a destination (RG) which is, in fact, a gate circuit. This operation is performed by an instruction *s*, R. The multiplication process may be said to commence with beat A2 of Bar 1, during which the multiplier R is fed out from the main store MS in dynamic form for the first time, and then continues until the process is complete. As the multiplication proceeds the multiplier R is read from the main store MS during each action beat in unchanged form while the multiplicand D is regenerated in the subsidiary store DS, being delayed by one digit period (and thus effectively multiplied by two) during each regeneration. A "1" digit in the least significant place of the original multiplicand D (a "1" digit is inserted in this position, as will be explained later, if one does not exist in the initial multiplicand number D) gives rise to a signal at each reading and regeneration of the multiplicand D which is used to select the coincidentally occurring digit of the multiplier R in the gate circuit RG to which such multiplier R is fed from the main store MS, and to determine whether or not it is a "1." If the digit is a "1" the multiplicand number D is fed through a further gate circuit to the adding unit of an accumulator A forming part of the machine; if the digit is a "0" this gate circuit is not opened and the currently occurring version of the multiplicand D is not fed to the accumulator. This process continues until the last "1" digit in the multiplier number R has been utilised, when the multiplication process is complete and is terminated forthwith.

Bar 1 is therefore of indefinite extent, being terminated only when the multiplication process is completed. This extension of the normal bar length is ensured by inhibiting the prepulse which the machine would normally give at the end of beat A2. This inhibition is controlled by a trigger circuit which is triggered during action beats so long as there exists in the multiplier number R a "1" digit of higher order than the digit coincident with that digit in the currently reproduced version of the multiplicand number D which was the digit of lowest significance in the original form. The actual inhibition may be obtained simply by employing an output signal from the trigger circuit, when in the triggered condition, to close a gate circuit through which the prepulses are normally fed to the portions of the machine which they control. The machine described in the aforesaid article by T. Kilburn has a prepulse generating circuit which produces prepulses at the commencement of every second scan beat (once every four beats) but this operation may be modified to give rise to prepulses once every five beats if a mode of working with double-length numbers is employed in which the number-transfer or like operation normally effected in the fourth or A2 beat of a four-beat rhythm is extended so as to take place, half in that beat and the second half in an additional fifth beat, known as the Action 3 or A3 beat. Inhibition for the purpose of the multiplication process can in this machine clearly be obtained by controlling a gate in the path of the generated prepulses. The prepulse generating circuit could however be organised to generate prepulses at the commencement of every scan beat (every other beat) or at the commencement of every beat, in which case the machine itself would have to be designed to inhibit the necessary prepulses to cause operation in a desired 4 (or 5) beat rhythm. If the prepulse generator is of this type then obviously the inhibition of prepulses during a multiplication process could be obtained by the same mechanism, controlled by a signal from the trigger circuit previously referred to.

It will be apparent that the only modifications which are required to the machine as described in the aforesaid article by T. Kilburn are the provision of the two additional outlets or destinations, DS and RG, from the main store MS, with suitable gating devices operating upon them, to ensure that information is fed to them only when the appropriate instructions *s*, D and *s*, R are set up on the function staticisor of the machine, and the provision of the necessary function digits in the instruction words utilised in the machine to enable the extra instructions to be uniquely defined.

One arrangement of apparatus for carrying out the present invention in association with a digital computing machine of the type described in the aforesaid article by T. Kilburn will now be described.

In the block schematic diagrams employed for simplified illustration of the arrangements according to the described embodiment of the invention, reference to a gate circuit is intended to mean a coincidence or "and" type of device and conveniently (unless otherwise specifically stated) of the multiple-diode type as described by C. H. Page in "Electronics," September, 1948, pp. 110–118, and shown more particularly in Fig. 2(F) of that article. Similarly any reference to trigger-circuit (unless otherwise specifically stated) is intended to mean a bi-stable device, sometimes known as a flip-flop. An example of such a circuit is to be found in the M. I. T. Radiation Laboratory Series, vol. 19, "Waveforms" (McGraw Hill) 1949, p. 164, Figs. 5–4 and 5–5. Such illustrated circuit is one having a single triggering input connection by which the state of the circuit is reversed from its "off" to its "on" state by one input pulse and then from its "on" to its "off" state by the next input pulse and so on but it is also well known to arrange such circuits with separate triggering and resetting inputs as shown, for example in "U. H. F. Techniques," by Brainerd et al. (Chapman & Hall), 1942, p. 174, Fig. 4–8. The term "buffer circuit" where used is intended to mean what is sometimes referred to as a logical "or" device and an example of a suitable circuit is to be found in the aforesaid Page reference at Fig. 2(G).

Figure 3:
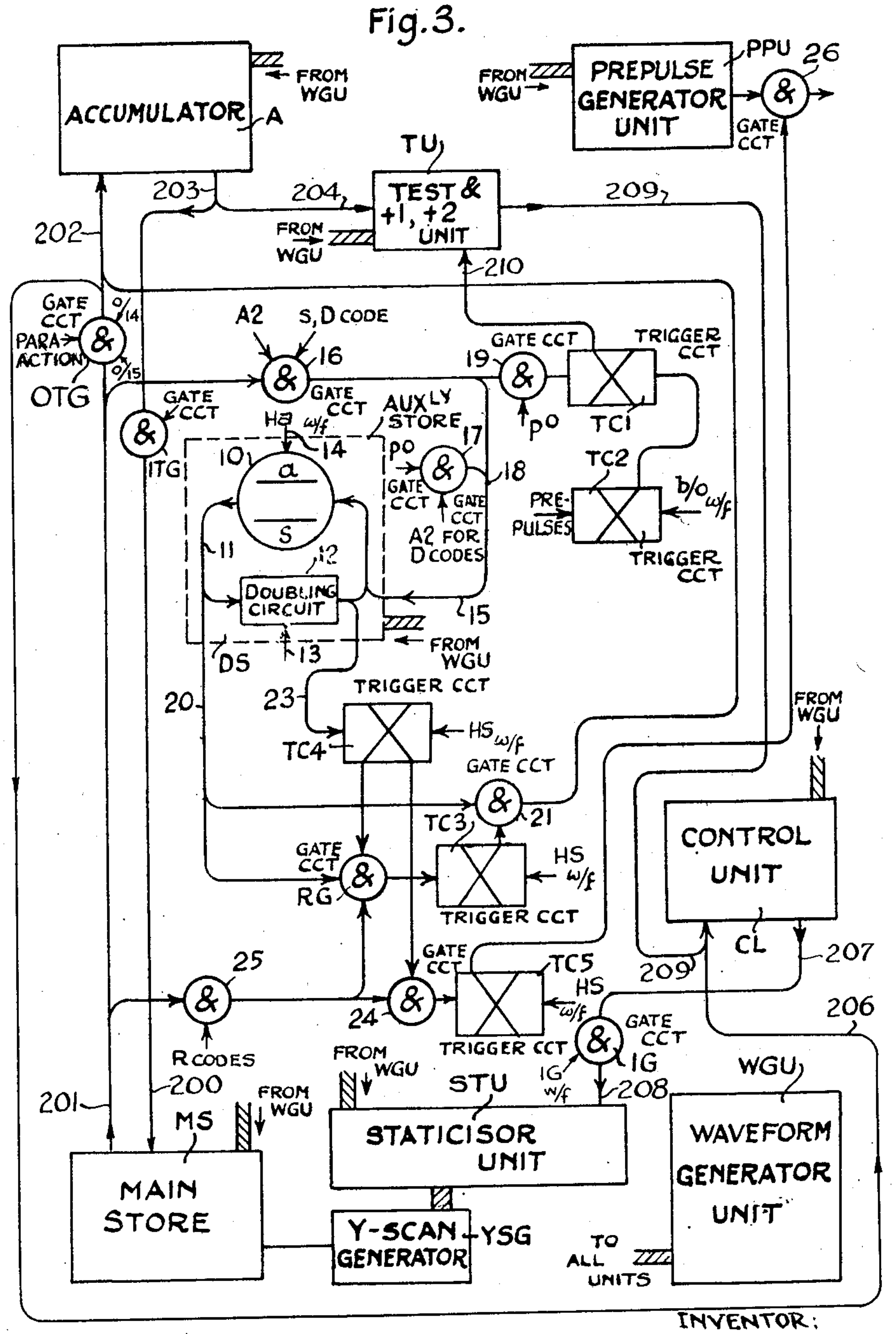
Figure 6:
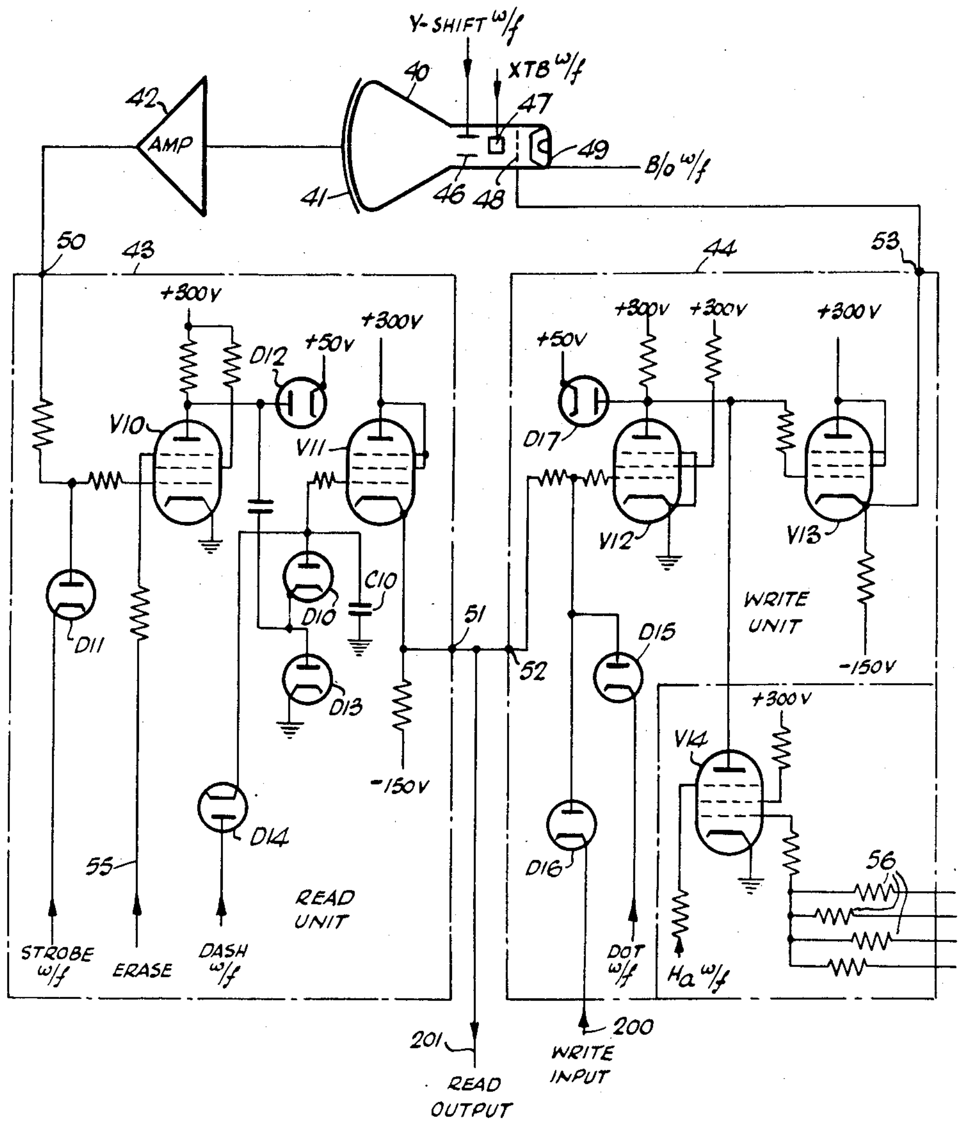
Fig. 6 is a part-schematic circuit diagram of the main store MS.

Referring first to Fig. 3, the electronic digital computing machine within which the present invention is shown embodied comprises a main store MS which will be described in greater detail later with reference to Fig. 6 and which includes a cathode ray tube type of storage device to which input data signals may be applied over lead 200 by way of inward transfer gate circuit ITG and from which data word signals may be read out over output lead 201. The machine includes an accumulator A which will also be described in greater detail later with reference to Fig. 7 and which also includes a cathode ray tube type of data storage device in association with an internal arithmetic unit such as an adder by which any existing data word signal held in the accumulator may be combined with a further data word signal applied thereto on its input lead 202. The input lead 202 is supplied with signals either by way of gate circuit OTG from the output lead 201 of the main store MS or over lead 205 from the gate circuit 21 of the arrangements according to the present invention as described later. The signal held in the accumulator A may be read out when required on the output lead 203 and fed either through the gate circuit ITG to the main store MS or over lead 204 to a test unit TU, which will be described later with reference to Fig. 10, and which serves to examine the applied signal and, in accordance with the result of such test, to supply a suitable output signal over lead 209 to the control unit CL.

The machine is one operating at a regular rhythm comprising a major cycle or bar period composed of four equi-length minor cycle or beat periods and the operation of the various parts is controlled, in the usual way, by a control unit CL whose form will be described in greater detail later with reference to Fig. 8. This control unit includes a cathode ray tube type of storage device for storing two separate signal words, known as the C. I. (control instruction) and the P. I. (present instruction). The C. I. word is normally held continuously within the control unit store and is modified once at the beginning of each bar period by the signal from the test unit T. U. over lead 209 as referred to above, while the P. I. word is fed thereto once in each bar from the main store M. S. over lead 206. Such C. I. and P. I. words are applied, during different beats of each bar period, to a staticisor unit S. T. U. through lead 207, instruction gate I. G. and lead 208.

The staticisor unit S. T. U., the nature of which will be referred to in detail later with reference to Figs. 9 and 11, comprises a plurality of similar sections each adapted to staticise a different one of the digits of a C. I. or P. I. instruction word fed thereto over lead 208 and therefrom to provide control potentials for operating the various gate and other routing means within the machine and the address selecting apparatus of the Y-scan generator YSG whose form will also be referred to later with reference to Fig. 9. Such generator YSG serves to control selection of the required word storage location or address within the main store MS.

The commencement of each operative bar of the machine rhythm is controlled by a special starting signal known as a Prepulse provided by the Prepulse generator unit PPU which will also be described in greater detail later with reference to Fig. 12.

Figure 5:
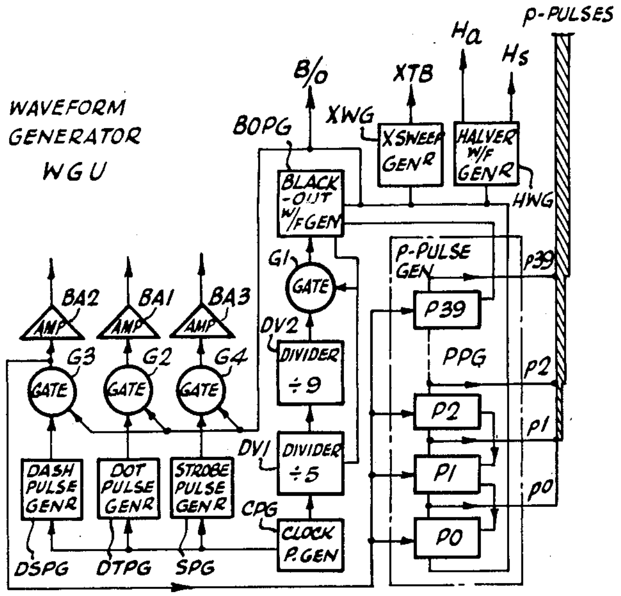
Fig. 5 is a more detailed schematic diagram showing the arrangements of the waveform generator unit WGU.

The operation of the machine with its bar and beat rhythm is governed continuously by a series of repetitive waveforms which are generated in the waveform generator unit WGU whose nature will first be described in greater detail with reference to Fig. 5.

*Waveform generator unit WGU*

The basic timing of the machine is controlled by a clock pulse generator circuit CPG providing a series of square pulses with a period time of 8.5 microseconds and hereinafter called clock pulses. The form of such clock pulses is shown in Fig. 13*a*. Each beat of the machine rhythm covers a time period embraced by a group of 45 of these clock pulses of which 40 successive clock pulse intervals are used to signal the successive digit values of a 40-digit number or data word and the remaining 5 clock-pulse intervals to accommodate the flyback motion of the beams of the cathode ray tube stores. The clock pulse waveform is applied to a divider circuit DV1 of any suitable form, e. g. of the well known phantastron type described in U. S. Patent No. 2,549,874 by F. C. Williams, issued April 24, 1951. Divider circuit DV1 provides an output pulse for every 5 input clock pulses as shown in Fig. 13*b* and this waveform is applied to a second divider circuit DV2 of similar form to circuit DV1 but dividing by a factor of 9 to provide an output pulse for every 45 input clock pulses to divider DV1. The output from divider DV2 is shown in Fig. 13*c*.

The pulses from divider circuit DV1 provide one triggering input to a trigger circuit forming the blackout waveform generator BOPG, the other or resetting input of which is supplied by the output from divider circuit DV2 by way of a gate circuit G1 controlled by the output from divider circuit DV1. The consequential output from circuit BOPG is the blackout or B/O waveform shown in Fig. 13*d* consisting of a positive-going square pulse during the period of clock pulses 1–5 and a negative-going level during the remaining clock pulses 6–45 of each beat period. This waveform is used for suppressing the cathode ray tube beams during their flyback motion and for other timing purposes.

The cathode ray tube storage devices each requires the usual saw-tooth waveform to effect the requisite line scanning motion of the tube beam and this is generated in X-sweep generator XWG which is of conventional single-stroke sweep generator form such as is described in the M. I. T. Radiation Laboratory Series, vol. 22 (McGraw Hill) 1948, p. 134, Fig. 4.41. This generator is controlled by the blackout waveform from generator BOWG whereby the flyback portion of the saw-tooth wave commences at the instant of commencement of each positive-going blackout pulse and the linear scanning portion at the instant of termination of such positive-going pulse. In practice push-pull or anti-phase versions of all waveforms including this saw-tooth waveform are provided but, for simplicity, only one version is shown on the drawings. The XTB waveform is shown in Fig. 14*b* with relation to the B/O waveform shown to the same scale in Fig. 14*a*.

As described in the aforesaid article by F. C. Williams and T. Kilburn, the setting up of the requisite charge patterns on the screen of a storage tube to represent the binary digits "0" or "1" is effected by intensity modulation of the tube beam for time periods of different length whereby, due to the concurrent X scanning movement of the tube beam, either a "dot" or a "dash" charge pattern is provided. For effecting such beam modulation the machine is provided with a dot pulse generator DTPG and a dash pulse generator DSPG, each of which comprises a mono-stable trigger circuit such as is described in M. I. T. Radiation Laboratory Series, vol. 19, pp. 166–171—see particularly Fig. 5–10. These circuits are each controlled by the clock waveform output from generator CPG. The constants of the circuit of generator DTPG are such as to provide a series of 2-microsecond negative-going square pulses each coincident with a clock pulse as shown in Fig. 13*f* while the corresponding constants of the generator DSPG are such as to provide a series of 5-microsecond negative-going square pulses each coincident with a clock pulse as shown in Fig. 13*e*. For selective examination of the output signals developed within a cathode ray tube storage unit use is made, again as described in the aforesaid article by F. C. Williams and T. Kilburn, of a strobe waveform as shown in Fig. 13*g* and comprising a narrow positive-going pulse coincident with each dash and dot pulse. These strobe pulses are generated in strobe pulse generator SPG also comprising a mono-stable trigger circuit controlled by the clock pulse waveform. The outputs from the generators DTPG, DSPG and SPG are supplied respectively through separate gate circuits G2, G3 and G4 each controlled by the blackout waveform (Fig. 13*d*) whereby the pulse outputs from the three generators are each suppressed during the blackout pulse period of each beat. The outputs from the three gates are respectively made available throughout the machine through buffer amplifiers BA1, BA2, and BA3 of conventional form.

In order to allow selection or examination of any desired one of the 40 different digit intervals *p*0, *p*1 . . . *p*39 of each beat, there is provided a group of 40 separate single-pulse waveforms each on separate leads and each consisting of a single 5-microsecond dash pulse coincident respectively with the first (*p*0), second (*p*1), third (*p*2) . . . fortieth (*p*39) digit interval of the beat. These waveforms will hereinafter be referred to as *p*-pulses and Fig. 13*h* shows the first of the group known as the *p*0-pulse comprising a negative-going pulse synchronised with the first dash pulse in each beat while Fig. 13*i* shows the next pulse of the group, i. e. the *p*1-pulse, and Fig. 13*j* the last pulse of the group known as the *p*39-pulse.

These *p*-pulses are generated in circuit PPG comprising a series of combined trigger and gate circuits P0, P1 . . . P39 wherein each gate circuit is supplied with the dash waveform available at the output of gate G3 while the trigger circuits are respectively interconnected after the manner of a binary counter chain whereby as one trigger circuit is reversed from its "off" to its "on" state to open its associated gate circuit, it resets the preceding trigger circuit of the chain from the "on" to the "off" state. The passage of a dash pulse through any one of the associated gate circuits is arranged to set the next following trigger circuit of the chain to its "on" condition. The first trigger circuit P0 of the series is supplied with the blackout waveform (Fig. 13*d* and 14*a*) whereby such circuit P0 is triggered "on" by the trailing edge of each blackout pulse while the last trigger circuit P39 of the series is arranged to be reset by the leading edge of each blackout pulse. The operation of the generator PPG is briefly as follows. As circuit P0 is set "on" at the end of the blackout pulse its associated gate is opened to allow the next available dash waveform pulse, i. e. that coincident with the first or *p*0 digit interval, to pass therethrough as the *p*0-pulse waveform (Fig. 13*h*). The passage of this pulse triggers the next circuit P1 to its "on" state which conditions the associated gate circuit to pass the next following dash pulse in the *p*1 digit interval to form the *p*1-waveform (Fig. 13*i*). The triggering on of circuit P1 resets circuit P0 to its "off" state so that such next dash pulse in digit interval *p*1 is not passed through the circuit P0. A similar operation occurs at each of the other circuits P2 . . . P39 until the last dash pulse in digit interval *p*39 of the beat is passed on the output lead from circuit P39 to form the *p*39-pulse waveform (Fig. 13*j*) whereupon such circuit P39 is reset "off" by the immediately following leading edge of the blackout pulse (Fig. 13*d*).

As referred to in the aforesaid article by T. Kilburn and as described in detail in the article by F. C. Williams and T. Kilburn it is necessary to effect systematic regeneration of each of the storage addresses in a cathode ray tube store and this in turn involves the use of the so-called alternate or scan-action rhythm in which alternate beat periods, known as scan beats, are used for effecting systematic regeneration of the different storage locations and the intervening beats known as action beats are those in which any desired storage location is available for use in operation externally of the storage tubes. For effecting control of such scan-action rhythm use is made of the so-called halver waveform shown in its two anti-phase versions H*a* and H*s*, in Figs. 14*c* and 14*d* and comprising a square wave whose alternate positive and negative half-cycle periods coincide with the scan-action beats of the machine rhythm. This waveform is generated in the halver waveform generator HWG which comprises a trigger circuit having a single reversing input terminal supplied with the B/O waveform (Fig. 14*a*) whereby it is reversed once at the beginning of each beat period.

A number of further waveforms are provided; these will be dealt with later in connection with the particular element of the machine to which they are related.

The data word signals, i. e. both computation number and instruction signals, used in the machine take the form of a pulse train of 40 digit intervals, *p*0 . . . *p*39 and wherein binary value "1" is indicated by the presence of a "dash" pulse and the binary value "0" by the absence of such a pulse. In the number signals the successive digit intervals *p*0 . . . *p*39 represent respectively ascending binary power values, e. g. $2^0$, $2^1$ . . . $2^{39}$ whereas in instruction signals the five digit intervals *p*0–*p*4 serve to signal a store address location and other digit intervals, such as *p*13, *p*14, *p*15, to signal a function code for controlling the machine according to the desired form of its operation.

*Main store MS*

The main store MS includes, in practice, a plurality of separate cathode ray tube storage devices but for simplicity in the present instance it will be assumed that one tube only is used. Such store is shown in Fig. 6 and comprises a cathode ray tube 40 having the usual cathode 49, beam modulating electrode 48, X-deflection plates 47, and Y-deflection plates 46. In addition the tube is provided with a signal pick-up plate 41 arranged close to the screen of the tube and upon which are impressed, during operation, signal potentials of characteristic form according to the storage charge pattern laid down on the tube screen by bombardment thereof by the tube beam in the manner explained in the aforesaid article by F. C. Williams and T. Kilburn. The XTB waveform (Fig. 14*b*) is applied to the X-deflection plates 47 to produce linear X scanning motion over a storage line once during each beat period while in addition a Y-shift or vertical deflection potential is applied from the Y-scan generator YSG (Fig. 3) to the Y-plates 46. The B/O waveform is applied to the cathode 49 of the tube. The signal plate 41 is connected to the input of an amplifier 42 of conventional form, e. g. as described in connection with Fig. 31 of the aforesaid article by F. C. Williams and T. Kilburn, and has its output connected to the input terminal 50 of a read unit 43 which will be described in detail later. The output terminal 51 of the read unit 43 is connected directly to the input terminal 52 of a write unit 44 which will also be described in detail later and whose output terminal 53 is connected to the beam modulating electrode 48 of the tube. The read output connection 201 for the store is obtained also from the output terminal 51 of the read unit while a separate write input lead 200 is provided for the write unit. The read unit comprises in detail a first thermionic valve V10 having its control grid connected to the input terminal 50 and having its anode output signal supplied by way of diode D10 to the control grid of a second valve V11 arranged as a cathode follower with its cathode output connected to the output terminal 51 of the read unit. The control grid of valve V10 is also supplied by way of diode D11 with the strobe waveform (Fig. 13*g*) while its suppressor grid is connected to a lead 55 to which an erase potential, normally at earth level, may be applied as desired. The cathode of valve V10 is earthed while its anode is clamped at a maximum potential of +50 v. by means of diode D12. The diode D10, through which the signal output from valve V10 is applied to valve V11, has its cathode connected to the anode of a further diode D13 whose cathode is connected directly to earth whereby the potential of the control grid of valve V11 cannot rise above earth. A condenser C10 is connected between the control grid of valve V11 and earth while such control grid is also supplied by way of diode D14 with the dash waveform (Fig. 13*e*).

In the operation of this read unit, valve V10 is normally held cut off as the output from amplifier 42 is biased to a resting level of —15 v. while the resting level of the strobe waveform is —10 v. Unless both inputs to the control grid of valve V11 rise at the same time sufficiently to turn on the valve V10 the valve will remain cut off. As described in the aforesaid article by F. C. Williams and T. Kilburn scanning of the charge pattern by the tube beam produces a negative transient when the charge pattern is representative of binary value "0" and a positive transient when the charge pattern is representative of binary value "1." The arrival of any corresponding but amplified negative transient from amplifier 42 consequently fails to turn on valve V10 which remains inoperative. Valve V11 is accordingly not affected and no change is present at the output terminal 51 of the read unit. On the arrival of a positive transient (representing binary value "1") control grid of valve V10 is raised during the coincident portion of the strobe pulse whereby valve V10 is turned on momentarily. A negative-going pulse from the resting level of +50 v. is accordingly generated at the anode of the valve and is applied through diode D10 to control grid of valve V11 where it lowers the control grid potential and simultaneously charges condenser C10 negatively. During this time the dash waveform applied to diode D14 has lowered the anode potential of such diode to say, —20 v. from its normal earth resting level whereby condenser C10 remains charged negatively until the end of the dash pulse when, consequent upon the raising of potential of the anode of diode D14, condenser C10 is discharged and the control grid potential of valve V11 is again raised. As a result, a negative-going pulse, similar to a dash pulse, is generated at the cathode of valve V11 and is available at the output terminal 51 for each positive transient input from amplifier 42.

The write unit 44 comprises valve V12 having its control grid connected to the input terminal 52 and also by way of diode D16 to the write input lead 200, and, further, by way of diode D15 to the source of the dot waveform (Fig. 13*f*). The anode of valve V12 is clamped at a maximum level of +50 v. by means of diode D17 and is connected to the control grid of further valve V13 arranged as a cathode follower and having its cathode output connected to the output terminal 53. The anode of valve V12 is also, in the case of a multiple storage tube type of store, connected to the anode of a pentode valve V14 known as the "blackout valve," whose screen grid is supplied with a normally constant operating potential but whose suppressor grid is supplied with H*a* waveform (Fig. 14*c*). The cathode of the valve is earthed while the control grid is connected through high value lead resistors 56 to a number of different sources of control potential, normally different sections of the staticisor MST.

In the operation of this write unit, in the absence of any input signal to the control grid of valve V12 either from input terminal 52 or by way of write input lead 200, the valve is normally conducting and its anode potential is therefore low whereby the control grid of valve V13 is similarly low to produce a potential at the valve cathode sufficiently negative to serve to hold the beam of the interconnected tube 40 at its cut-off level. During each negative pulse of the dot waveform, applied through diode D15, valve V12 will be cut off and a positive-going output, limited to +50 v. by diode D17, will be available at its anode thereby providing a similar positive input to the control grid of valve V13 and a corresponding positive-going output at the cathode of the valve for application through output terminal 53 to the beam modulating electrode 48 of the tube 40 to serve to turn on the beam for the period of the dot pulse. If, however, either the output from the read unit 43 through input terminal 52 or the separate input through write input lead 200 comprises a negative dash pulse representing binary value "1," the grid of valve V12, in addition to being driven negative by the dot pulse as just described, is also driven negative and held negative for the longer dash pulse period and in consequence the output from valve V13 comprises a positive-going pulse of similar extended duration with resultant extension of the period in which the beam of the tube is turned on to record a dash or binary "1" value charge pattern.

The blackout valve V14, when used, is arranged so that whilst it is conducting to its anode the consequential lowering of its anode potential causes a similar lowering of potential at the interconnected anode of valve V12 and control grid of valve V13, regardless of any input potentials applied to valve V12. The interconnected beam modulating electrode 48 of the tube 40 is accordingly held continuously lowered and the tube is cut off. The blackout valve V14 is arranged to be cut off at its suppressor grid during each scan beat period of the machine rhythm by the *Ha* waveform (Fig. 14*c*) so that the tube 40 is always free to be modulated at its electrode 48 during such scan beat periods. In addition the blackout valve V14 can be cut off at its control grid provided a negative potential is applied to each of the separate inputs for the leak resistors 56. Only when each of these separate inputs is driven negative simultaneously, however, can the valve V14 be cut off at its control grid so that by connecting such input leads to different sections of the staticisor it can be arranged that the blackout valve is cut off during intervening action beats only when a particular required digit configuration of the instruction signal has been set up on the staticisor MST.

*Accumulator A*

Figure 7:
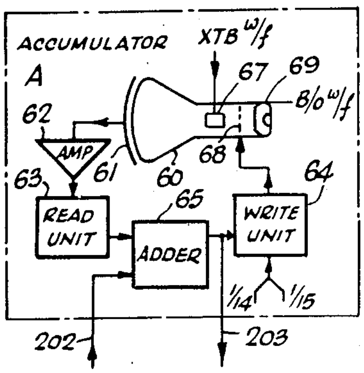
Fig. 7 is a more detailed schematic diagram of the arrangements of the accumulator A.

The accumulator A, shown in Fig. 7, comprises a single cathode-ray storage tube arranged in substantially identical manner to that of the main store described in connection with Fig. 6. The tube 60 has a cathode 69, a beam modulating electrode 69 and X-deflection plates 67 as well as a signal pick-up plate 61. This tube, in the present simple case, is assumed to be of one storage line capacity only and in consequence no provision need be made for Y-shift. The signal output from signal pick-up plate 61 is fed through amplifier 62 to the input terminal of a read unit 63 as in the main store. The output from the read unit, however, instead of being applied direct to the write unit 64, is applied to one input terminal of an arithmetic unit 65 which can be of any convenient form, for example, an adder. A second input terminal of such arithmetic unit 65 is supplied by way of the accumulator input lead 202. The output from the arithmetic unit 65 carrying a signal representing the desired combination e. g. the sum of the two numbers represented by the input signals, is connected to the input terminal of the write unit 64 whose output terminal is connected, as in the case of the main store, to the beam control electrode 68 of the tube. The output from the arithmetic unit 65 is also made available as a read output on accumulator output lead 203. The blackout valve of the write unit 65 (see valve V14, Fig. 6), is, in this instance, arranged to be controlled through a buffer or combining gate with outputs from the staticisor MST so that in addition to being operative during scan beats to effect regeneration of any content of the storage tube, it is also active during any action beat when either of the *p*14 or *p*15 digit positions of the staticisor MST are set up with a digit value of "1." Any instruction requiring the use of the accumulator will contain at least one of such digit values.

The adder circuit 65 can be of any convenient known type capable of accepting two simultaneous electric pulse signal trains and of providing a sum-representing pulse signal train output which is still in time synchronism, digit by digit, with the input trains. One example of such a circuit is to be found in U. S. Patent No. 2,671,607, filed Oct. 3, 1949, by F. C. Williams et al.

*Control unit CL*

Figure 8:
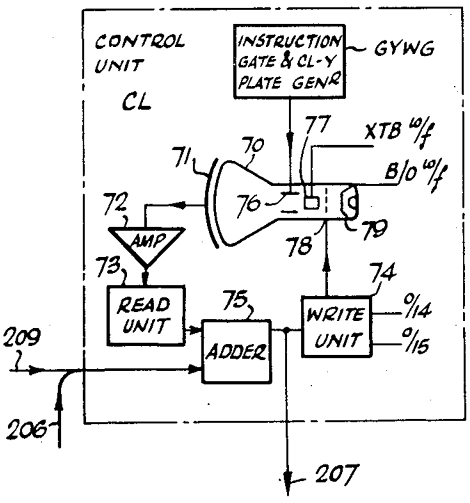
Fig. 8 is a more detailed schematic diagram of the arrangements of the control unit CL.

The form of the control unit CL is shown in Fig. 8 and comprises a single cathode ray storage tube 70 having a cathode 79, a beam modulating electrode 78, X-deflection plates 77, Y-deflection plates 76 and a signal pick-up plate 71 as already described in connection with the tube in the main store MS. As in the main store, the signal pick-up plate 71 is connected by way of amplifier 72 to the input terminal of a read unit 73 whose output terminal, instead of being connected directly to the input terminal of the associated write unit 74 is, instead, connected to one input terminal of an adding unit comprising an adding circuit of any convenient and known form, for instance, as described in the aforesaid U. S. Patent No. 2,671,607, filed Oct. 3, 1949, by F. C. Williams et al. The second input terminal of this add unit 75 is supplied over lead 209 from the test unit TU or over lead 206 from the main store MS. The sum-representing output signal from the add unit 75 is supplied to the input terminal of the write unit 74 and is also made available as a read output over lead 207 for supply to the gate circuit IG. The output from the write unit 74 is supplied to the beam modulating electrode 78 of the tube 70 in a manner similar to that already described in connection with the main store MS. The write unit 74 in this instance comprises a blackout valve as already described in connection with the main store MS and this has two controlling inputs connected respectively to those output terminals of the *p*14 and *p*15 digit sections of the staticisor MST which are at their active negative level when such sections are set up in accordance with the digit values "0" and "0" respectively. At all other times such blackout valve is turned on during action beats and the tube is accordingly turned off.

The X-deflection plates 77 are supplied with the XTB waveform (Fig. 14*b*) while the Y-deflection plates 76 are supplied with the output from the waveform generator unit GYWG which will be described later. The output waveform from the latter unit is such that there are two scanning levels one of which, known as the P. I. line, is normally rendered operable during the second and third beats A1 and S2 of each bar and the other of which, known as the C. I. level, is normally rendered operative during the first and fourth beats S1 and A2 of each bar.

In the operation of this control unit CL the tube 70 is normally operative in beats S1, A1 and S2 only of each bar. During beat S1 it provides a read out signal from the C. I. line of the tube 70 through amplifier 72 to read unit 73. Such read-out signal consists of a (C. I.) number denoting the address in the main store MS of the last used instruction. This C. I. number signal while being passed from the read unit 73 to the add unit 75 coincides with a +1 or +2 input signal on the input lead 209 from the test unit TU whereby the C. I. number returned to the tube 70 is increased in value by either one or two. The new C. I. number (which represents the address in the main store MS of the next instruction) is rewritten on the C. I. line of tube 70 instead of the old number and is, at the same time made available externally on lead 207 and is fed to gate circuit IG.

During the next beat A1, the beam of the tube 70 scans the other or P. I. line owing to the operation of unit GYWG and the read out signal through amplifier 72 passes to the read unit where, however, it is normally blocked by the provision of an erase voltage during this beat. Simultaneously a second number is fed in, over the alternative input 206 from the main store MS, to the add unit 75 and, as there is no second signal from the read unit 73, this new number is applied unaltered to the write unit 74 and is thereupon rewritten on to the P. I. line of the tube. In the next following beat S2 no input is available either from the unit TU or from main store MS and the aforesaid P. I. number previously written in is now regenerated and is additionally made available on output lead 207 to the gate circuit IG.

*Staticisor STU*

Figure 9:
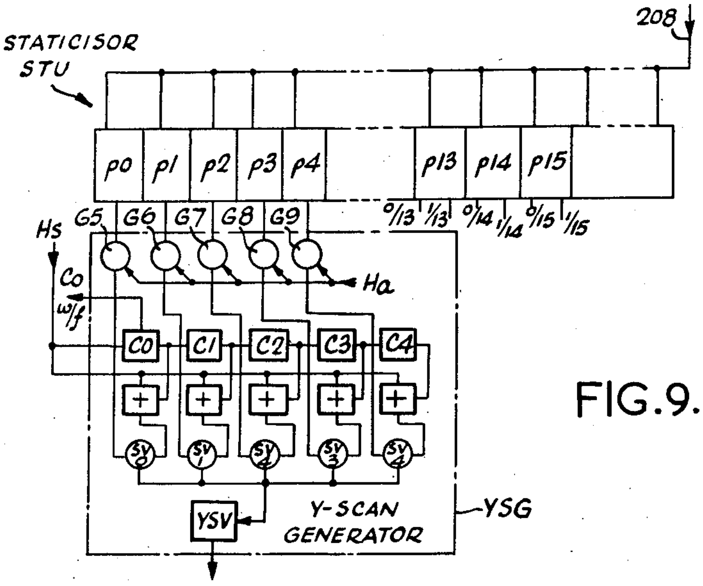
Fig. 9 is a more detailed schematic diagram of the arrangements of the staticisor unit STU and its associated Y-scan generator YSG.
Figures 11, 12:
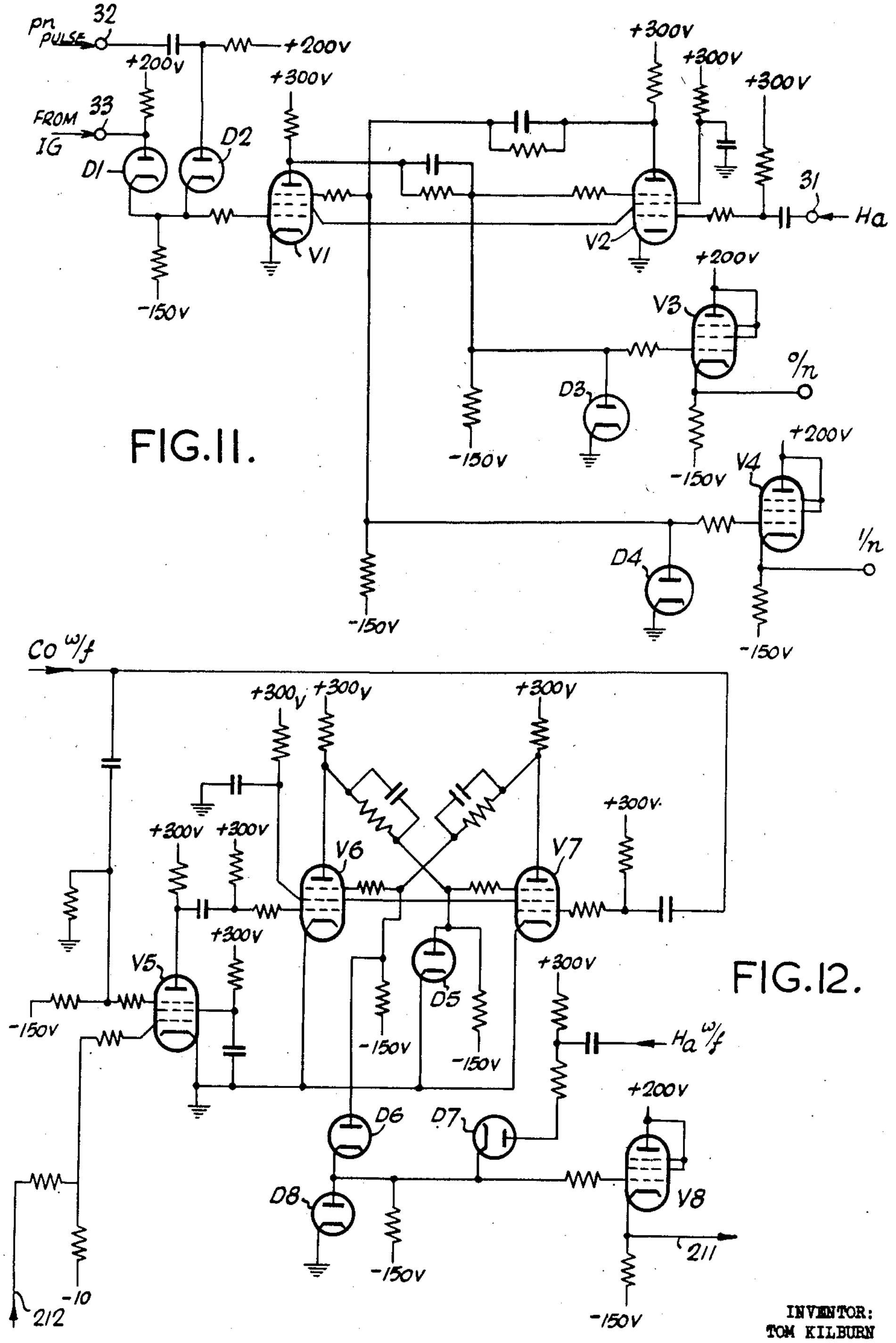
Fig. 11 is a detailed circuit diagram of one section of the staticisor unit STU.
Fig. 12 is a detailed circuit diagram of the prepulse generator unit PPU.

The staticisor STU is shown schematically in Fig. 9 and a detailed circuit diagram of one of its plurality of similar sections is shown in Fig. 11. Referring first to Fig. 11, each section comprises a trigger circuit consisting of valves V1 and V2, provided with anode-to-suppressor-grid cross-coupling. The control grid of valve V1 is connected to the joined cathodes of diodes D1 and D2 which together form a double-diode coincidence gate by which the simultaneous application of negative-going pulses to the input terminals 32 and 33 is necessary before any corresponding negative pulse is applied to the control grid of the valve.

The control grid of the opposite valve V2 is supplied with resetting pulses from terminal 31. Such pulses are derived from the H*a* waveform supplied through the differentiating network shown. The square-wave potential at the suppressor grid of valve V1 is applied to the control grid of valve V4 arranged as a cathode-follower stage and whose output, which is negative-going whenever the trigger circuit is in its triggered state, constitutes the so-called "1/*n*" staticisor output. The potential at the suppressor grid of valve V2 is similarly applied to cathode-follower valve V3 whose output forms the "0/*n*" staticisor output.

In the operation of the parts so far described, the terminal 33 is supplied with the whole of the instruction word pulse train arriving fom gate circuit IG over lead 208 whereas the other terminal 32 is supplied with a chosen one of the *p*-pulse waveforms in accordance with the particular digit position of an instruction word which is to be staticised by the staticisor section. Thus, if the section shown is to staticise the first digit of an instruction signal it would be supplied with the *p*0-pulse waveform, if it is to staticise the second digit it would be supplied with the *p*1-pulse waveform and so on. The trigger circuit normally rests in the condition where valve V2 is cut off and valve V1 is turned on, due to the application to the control grid of valve V2 of negative pulses derived from the H*a* waveform. During the subsequent arrival of an instruction word pulse signal train at terminal 33 if there is a negative pulse (indicating binary value "1") in that train at the time of the corresponding *p*-pulse a negative output is provided at the cathode of diodes D1 and D2 and this serves to turn off valve V1 thereby turning on valve V2 and producing the usual reversal of potentials at the anode and suppressor grids of the two trigger circuit valves. Under these conditions the 1/*n* output is negative-going and the 0/*n* output is positive (or earth).

When the trigger circuit is reset again to its off or "0" state by the negative input to terminal 31, the suppressor grid and anode potentials of valves V1, V2 are reversed again whereupon the 1/*n* output becomes positive (or earth) and the 0/*n* output becomes negative. These staticisor outputs are used throughout the machine for controlling gate circuits and other devices. The application of a particular staticisor section output is depicted on the drawings by legends such as those at the gate circuit G51 in Fig. 10 where the inputs "0/13, 1/14 and 1/15" refer to the staticisor sections *p*13, *p*14 and *p*15 respectively.

Referring now to Fig. 9 each of the plurality of similar sections *p*0, *p*1 . . . *p*39 of the staticisor STU have their input terminals 33 connected in parallel to lead 208 from gate IG whereas the terminal 32 of each section is separately supplied with the appropriate different one of the *p*-pulse series of waveforms.

The first five staticisor sections of digits *p*0 . . . *p*4 are used to control the operation of the Y-scan generator YSG by application of their "0" outputs through gate circuits G5, G6, G7, G8 and G9, each controlled by the H*a* waveform. Such staticisor outputs thus become effective during the action beat periods of the machine rhythm.

*Y-scan generator YSG*

The Y-scan generator YSG is shown only schematically as comprising a cascade-connection of a plurality of scale-of-two counter circuits C0, C1, C2, C3 and C4 supplied at the first counter circuit input C0 with the H*s* waveform. Each counter circuit produces square waves which are successively sub-multiples of the H*s* waveform frequency. This Y-shift generator is substantially identical with that which is described in detail with reference to Figs. 25 and 35 of the aforesaid article by F. C. Williams and T. Kilburn with the exception that the various manual control switches S0, S1 . . . S4 of Fig. 35 of that article are dispensed with and the control of the flip-flops 0, 1 . . . 4 which govern the anode followers feeding the control grids of the valves $T_0^1$, $T_1^1$, $T_2^1$, $T_3^1$, and $T_4^1$, are transferred to the output terminals of the aforesaid first five sections of the staticisor STU. When an appropriate potential is supplied from such output terminals of the staticisor sections the related ones of the valves $T_0^1$ . . . $T_4^1$ are cut off during action beats to cause the appropriate value of current flow to the Y-shift valve in a manner exactly analogous to that described in the paper with reference to direct manual control. In Fig. 9 of the present drawings, SV0, SV1 . . . SV4 indicate the aforesaid valves $T_0^1$ . . . $T_4^1$ of the aforesaid Fig. 35 of the Williams and Kilburn article while YSV denotes the Y-shift valve arranged as described with reference to Fig. 23 of the same article.

The Y-scan generator YSG accordingly provides a stepped waveform of the type shown in Fig. 25*h* of the aforesaid article in which the scanning level during alternate scan beats is progressively shifted by one line of the storage tube in the main store MS to effect sequential regeneration whereas during intervening action beats the level, which is continuously varied and not at a constant level as shown in the aforesaid Fig. 25(*h*) of the article, is determined by the setting, at the particular beat time, of the aforesaid first five sections of the staticisor STU.

*CL–Y plate waveform generator GYWG*

The instruction gate and CL–Y plate waveform generator already discussed in connection with the control unit CL shown in Fig. 8 is shown in more detail in Fig. 10 and comprises a first trigger circuit 80 whose reset terminal is supplied with the H*s* waveform and whose triggering terminal is supplied with the pre-pulse waveform from the prepulse generator unit PPU. A second trigger circuit 81 is also supplied at its reset terminal with the H*s* waveform and has its triggering input connected by way of a differentiating network to an output of the trigger circuit 80 whereby the trigger circuit 81 is triggered whenever the trigger circuit 80 is reset. An output of the trigger circuit 81 at its active (negative) level when the trigger circuit is in its triggered or "on" state is combined with an output from the trigger circuit 80 which is also at its active (negative) level when such trigger circuit is in its "on" state to form one controlling input of a gate circuit 82, the second controlling input of which is the H*a* waveform. The output from this gate circuit 82 constitutes the control potential for the instruction gate IG, Fig. 3. The same output from trigger circuit 80 also forms an input control potential over lead 83 to the test unit TU described later. One of the two antiphase outputs from the trigger circuit 81 is fed by way of a differentiating network and is combined with the other antiphase output from the same trigger circuit also fed through a differentiating network and a normally closed switch S/S to provide pulses whenever such trigger circuit 81 is either set "on" or is reset "off." These pulses are applied over lead 84 to the test unit TU and the action waveform generator AWG to be described. The output from trigger circuit 81 which is at its active (negative) level when the trigger circuit is in its "on" state is available over lead 85 as the Y-plate deflection waveform for the control storage tube 70, Fig. 8 and is referred to as the CL–Y plate waveform.

*Test unit TU*

Figure 10:
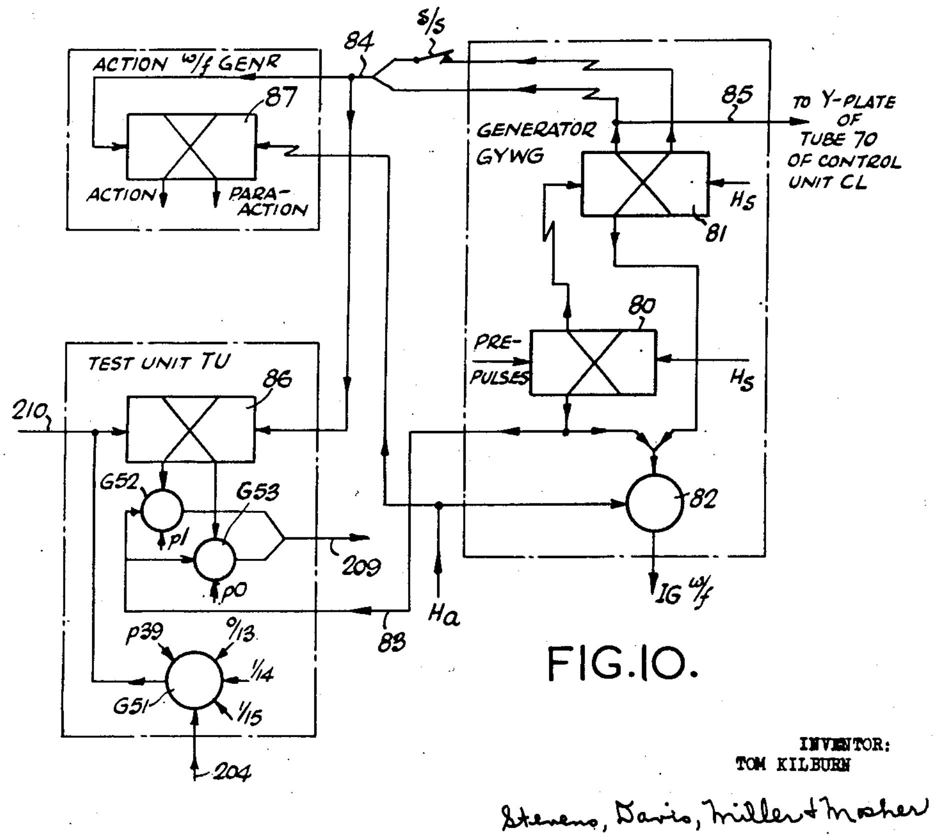
Fig. 10 is a more detailed schematic diagram of the test unit TU and two associated waveform generator circuits.

The test unit TU also shown in Fig. 10 comprises a trigger circuit 86 whose resetting terminal is supplied with the pulse waveform available on lead 84 from the CL–Y plate waveform generator GYWG while its triggering input terminal is normally supplied by way of a gate circuit G51 from the output lead 204 of the accumulator A. The gate circuit G51 is controlled by the *p*39 pulse waveform and also by the three separate outputs 0/13, 1/14 and 1/15 from the staticisor STU i. e. those which are at their active (negative) level when the function digits 13, 14 and 15 of an instruction word 0, 1, 1 respectively. One output from trigger circuit 86, that which is at its active (negative) level when the trigger circuit is triggered "on," is applied to gate circuit G52 also controlled by the *p*1 pulse waveform and by the output on lead 83 from trigger circuit 80 of generator GYWG. The other output from trigger circuit 86, that which is at its active (negative) level when the trigger circuit is reset "off" is applied as a controlling input to a gate circuit G53 which is also controlled by the *p*0 pulse waveform and by the same output on lead 83 from trigger circuit 80 of generator GYWG. The outputs from the two gates G52 and G53 are combined and constitute the pulse input on lead 209 to the control unit CL. The triggering input to trigger circuit 86 is, in connection with the present invention, also supplied over lead 210 from the trigger circuit TC1 (Fig. 3) which is later described.

*Action waveform generator AWG*

The action waveform generator which supplies, inter alia, the Para Action waveform controlling the gate OTG, Fig. 3 is also shown in Fig. 10 and comprises a trigger circuit 87 whose resetting input is supplied with the H*a* waveform and whose triggering input terminal is supplied with the pulse output on lead 84 from the unit GYWG. One output of this trigger circuit which is at its active (negative) level when the trigger circuit is in its "on" state constitutes the Action waveform and the antiphase output, which is at its active (negative) level when the trigger circuit is reset "off," constitutes the Para-action waveform.

*Prepulse generator PPU*

The form of the prepulse generator PPU is shown in Fig. 12 and comprises a pair of valves V6 and V7 arranged as a trigger circuit by cross-connections between their respective anodes and the suppressor grid of the opposite valve. The control grid of valve V6 is connected through a differentiating network to the anode of a further valve V5 whose cathode is earthed and whose control grid is connected by way of lead 212 with a source of potential which is positive when the machine is being operated automatically. The suppressor grid of valve V5 is supplied through a differentiating network with the C0 waveform (derived from the generator YSG, Fig. 9) and this waveform is also applied through a differentiating network to the control grid of the valve V7 of the trigger circuit. The suppressor grid of valve V6 is connected through diode D6 to the common cathode point of a double-diode coincidence gate including the further diode D7. The anode of the latter diode is supplied through a differentiating network with the H*a* waveform (Fig. 14*c*) and the cathode output point of the coincidence gate is connected to the control grid of a valve V8 arranged as a cathode follower and having its cathode output point connected to the output lead 211 by which the prepulse waveform (Fig. 14*e*) is supplied to other parts of the machine.

In the operation of this circuit valves V6 and V7 are normally in the condition where valve V6 is conducting and valve V7 is cut off due to the application of the differentiated negative pulses obtained from the C0 waveform to the control grid of valve V7. Valve V5 is normally conducting to its screen grid due to the application of the necessary positive potential on the lead 212 when the machine is operating but is cut off at its suppressor grid except during the times of the differentiated positive edges of the C0 waveform. These occur at the commencement of the second action or A2 beat of each normal bar and, by turning on valve V5 at that time produce a negative-going pulse at the valve anode which, by application to the control grid of valve V6 serves to reverse the trigger circuit. The circuit is thus placed in its reversed or triggered state at the commencement of each A2 beat of a bar and when in this state the resultant lowered potential at the suppressor grid of valve V6 is applied as an opening potential to the diode D6 of the coincidence gate comprising this diode and diode D7 whereby the negative-going edge of the H*a* waveform, which occurs at the beginning of the next following or S1 beat, is allowed to pass through the gate and to be applied to the cathode follower valve V8 thereby generating a corresponding sharp negative pulse which constitutes a prepulse or starting signal on the lead 211.

*Normal machine operation*

The operation of the machine thus described and without reference to the present invention will now be briefly reviewed. As stated the machine operates normally with a four-beat-to-the-bar rhythm comprising a first scan or S1 beat, followed by a first action or A1 beat, followed by a second scan or S2 beat and a final action or A2 beat.

Each bar is initiated by the release of a prepulse signal from the prepulse generator PPU due to the previous reversal of the trigger circuit of valves V6 and V7 (Fig. 12) in the last or A2 beat of the previous bar and the arrival of the negative edge of the H*a* waveform at the end of such beat A2. Such prepulse signal initiates operation of the unit GYWG (Fig. 10) by triggering the trigger circuit 80 of that unit whereby a gate-opening potential is supplied through gate circuit 82 of unit GYWG to the instruction gate IG. Simultaneously, owing to the triggering of trigger circuit 80, a gate-opening potential is available on lead 83 to each of gates G52 and G53, one of which will be opened dependent upon the state of the trigger circuit 86 of the test unit TU. Normally, with trigger circuit 86 in its "off" state, gate G53 is opened to allow a *p*0-pulse (value +1) to be fed over lead 209 to the adder 75 of the control unit CL (Fig. 8) for addition to the C. I. number already in the storage tube 70 of that unit.

During the immediately following S1 beat the C. I. number stored upon the C. I. line of the control unit CL has the external +1 signal added thereto in adder 75 and is then read out over lead 207 (Figs. 3 and 8) and gate IG, which is now opened, to lead 208 whereby such C. I. number is set up on the staticisor unit STU. This C. I. number comprises a chosen configuration of digits in the first five digit positions *p*0–*p*4 indicative of the particular storage line in the tube 40 (Fig. 6) of the main store MS where the next required P. I. or present instruction is located. The remaining digits of this C. I. number are always 0 and therefore the remaining sections of the staticisor STU are unaffected. During this same S1 beat the Y-scan generator YSG is operating under the control of the counter circuits C0 . . . C4 to effect systematic regeneration at one of the 32 storage lines of the tube 40 in the main store MS. The output potentials from the staticisor unit are not at this time effective to alter the scanning level owing to the presence of the gate circuits G5–G9 (Fig. 9).

At the end of this S1 beat the change of voltage of the H*s* waveform renders the counter circuits C0 . . .

C4 inoperative in the Y-scan generator YSG and transfers control to the output potentials of the first five staticisor sections *p*0–*p*4 of the staticisor STU whereby scanning during the next beat A1 takes place at a level in the tube 40 of the main store MS which is determined by the configuration of the first five digits of the aforesaid C. I. number signal fed to the staticisor unit STU. During this beat this selected P. I. word signal is read out from the main store MS over lead 206 to the control unit CL which, due to the reversal of the trigger circuit 80 of the unit GYWG (Fig. 10) at the end of the S1 beat, has caused triggering of the trigger circuit 81 to alter the level of the CL–Y plate waveform applied over lead 85 to the tube 70 (Fig. 8) thereby shifting the scanning level in the control unit storage tube 70 to the second or P. I. storage line. The aforesaid P. I. word signal arriving on lead 206 is thus fed into and stored on such P. I. storage line of the control tube. Instruction gate IG is at this time closed owing to closure of gate 82 (Fig. 10) by the H*a* waveform.

At the end of this beat A1 the sections of the staticisor unit STU are cleared back to zero by the H*a* waveform of their terminals 31 (Fig. 11) and the control of the Y-scan generator YSG reverts again at the beginning of the next or S2 beat to the counter circuits C0 . . . C4 whereby during such next S2 beat the next line in order of the main store MS is regenerated. During this beat the scanning level of the P. I. line is maintained and the previously stored P. I. word is now read out from the tube 70 (Fig. 8) over lead 207 and through instruction gate IG (Fig. 3) which is again opened during this beat by the potential derived from the gate 82 of unit GYWG (Fig. 10) under the control of the output from the trigger circuit 81 and the H*a* waveform so that such P. I. word signal is fed to the lead 208 and becomes set up upon the staticisor unit STU. This P. I. word signal, in addition to containing a particular configuration of its first five digits *p*0–*p*4 in accordance with the address location in the main store which is to be used in the instant computation step also contains a combination of function digits which are, for simplicity's sake, assumed in the present case to be the digits of positions (*p*13, *p*14, *p*15) whose combination serves to control the opening and closing of the different gate circuits and other elements.

At the end of the third or S2 beat, the control of the Y-scan generator YSG passes again from the counter circuits C0 . . . C4 to the staticisor unit STU whereby the main store MS is made active during the beat A2 at the required storage location. The control potentials from the function staticisor sections *p*13, *p*14 and *p*15 similarly operate to open or close the various gate circuits and other elements of the machine according to the particular operation which is being demanded and during such fourth beat the required operation takes place. Thus, for example, if the configuration of the function digits *p*13, *p*14, *p*15 called for a transfer of the number in the selected address of the main store MS to the accumulator A then gate OTG (Fig. 3) would be opened by the presence of digit values "0" at each of the digit positions *p*14 and *p*15 whereupon the required number signal would flow over lead 201 through gate OTG to lead 202 and so to the accumulator. Alternatively, if the operation demanded was one of testing the content of the accumulator then the address portion of the P. I. word signal would be irrelevant but the function digits would be of value "0," "1" and "1" respectively in the digit positions *p*13, *p*14 and *p*15 of the P. I. word. Such digit setting of the staticisor STU would ensure that gate G51 of the test unit TU (Fig. 10) was opened during the *p*39-pulse time of the aforesaid A2 beat so that any digit pulse indicating binary value "1" of the number signal fed from the accumulator A over lead 204 in the *p*39 digit position (usually regarded as indicative of negative sign) would act to trigger the trigger circuit 86 of the test unit TU (Fig. 10) thereby altering the setting of the trigger circuit from its normal "off" slate where gate G53 is opened to one in which gate G52 is opened. This would ensure that at the commencement of the next operative bar following the release of another prepulse signal as already described a *p*1-pulse would be fed over lead 209 to the adder 75 of the control unit CL (Fig. 8) instead of the normal *p*0-pulse thereby altering the numerical value of the C. I. number by +2 instead of +1 and so altering the sequence of instructions which would be obeyed in the programme. Such "conditional transfer of control" is a well known practice in the computer art.

Reverting now to Fig. 3, in order to carry out the present invention there is also provided within the computing machine a subsidiary storage unit DS which is shown in greater detail in Fig. 15. As shown in Fig. 15 this storage unit DS comprises an arrangement generally similar to that of the accumulator A or the control unit CL and included a single cathode each storage tube 10 having the usual cathode 89, beam modulating electrode 88, X-deflection plates 87, Y-deflection plates 86 and a signal pick up plate 81 which is connected, as before, to an amplifier 82 feeding its output to a read unit 83. The beam modulating electrode 88 is supplied with its controlling signals from a write unit 84. The read unit 83 has a read output lead 20 while the write unit 84 has a write input lead 15. The regenerative loop between the read unit 83 and write unit 84 is completed by way of a lead 11 to a doubling circuit 12 which comprises two parallel branches, one by way of a gate circuit 90 direct to the write unit 84 and the second by way of a unit 91 whose effect is to multiply the value of any signal train passing therethrough by a factor of 2, which unit 91 is in series with a further gate circuit 92 between lead 11 and the write unit 84. Each of the gate circuits 90 and 92 are controlled by potentials developed from the function digit sections of the staticisor STU when the latter are set up in accordance with a particular instruction, referred to as the *s*, R instruction, signalling a requirement to effect multiplication with a multiplier number transferred from the main store MS. By appropriate choice of the mutually anti-phase outputs from the relevant sections of the staticisor involved it is arranged that gate 90 is normally open but is closed when the said *s*, R instruction is set up on the staticisor whereas gate 92 is normally closed but is opened when such instruction is set up. This is effected, in a manner which will be apparent from the previous description of the staticisor sections, by allotting digit value "1" to each of the relevant function digits, e. g. *p*13, *p*14, *p*15 for signalling the *s*, R instruction. If the gate current 90 is arranged to be controlled by the 0/13, 0/14 and 0/15 outputs of STU and the gate circuit 92 by the 1/13, 1/14 and 1/15 outputs of the same staticisor sections, then only when each of the *p*13, *p*14, *p*15 sections of the staticisor STU are triggered will the gate circuit 92 be opened. When this occurs gate circuit 90 will automatically become closed. At all other times gate circuit 90 is open the read out signal on lead 11 will be regenerated unaltered in value but when gate circuit 92 is open, the signal on lead 11, by its passage through unit 91 will become doubled in value.

The unit 91 may be of any convenient form, for instance a delay line, effecting a delay of one digit interval of the machine rhythm between the signals applied at its input terminal and those derived at its output terminal. Alternatively and preferably the device may be a circuit of the so-called "shuttle" type as is described in detail with reference to valves V12 and V13 of Fig. 3 in U. S. Patent No. 2,671,607, filed October 3, 1949, by F. C. Williams et al.

The tube 80 is supplied at its X-deflection plates 87 with the XTB wave form to effect normal line scanning motion of the tube beam while its Y-deflection plates 86 are supplied with the Ha waveform whereby scanning, and the consequent facility to effect storage, takes place on two separate lines marked *a* and *s*. These lines are explored alternately in the action and scan beats respectively of the machine rhythm.

It will be observed that, for simplicity of illustration and brevity of description, the various gate circuits concerned with the multiplying arrangements according to the invention are shown with a controlling input denoted as a single arrow marked with a code legend, see for instance, gate 16 marked "S, D codes." Such single arrow denotes control by the appropriate sections of the staticisor STU in a manner exactly as already described whereby the gate is supplied with an opening potential only when the indicated coded instruction is set up on the staticisor.

The write input lead 15 of the storage unit DS is connected by way of a gate circuit 16 to the output of the main store MS. The gate circuit 16, which of the so-called "and" or coincidence-gate type, is normally closed and is arranged to be opened only during an A2 beat upon the setting-up upon the staticisor unit STU of an instruction including the code *s*D. Also connected to the writing input 15 of the store DS as an alternative source of signals is a further "and" gate 17 having two controlling inputs and arranged so as to supply therethrough a *p*0-pulse only during beat A2 whenever the code *s*-D is set up upon the staticisor STU. This input is fed by way of a buffer or so-called "or" gate 18.

The main-store output, whenever made available through the gate circuit 16 is also applied as one controlling input of another "and" gate 19 which is also supplied with the *p*0-pulse waveform, the output of the gate serving as a triggering medium for a trigger circuit TC1. This latter circuit is reset or retriggered by one output of a further trigger circuit TC2 which is itself arranged to be triggered by any emitted Prepulse and is retriggered (at the end of the immediately following S1 beat) by the leading edge of the Blackout waveform. One output of the trigger circuit TC1, that which is negative-going when the circuit is in its "on" or triggered state is applied as the alternative input to the test unit TU over lead 210 as already mentioned whereby such test unit will be caused subsequently to emit a +2 or *p*'-pulse instead of the usual *p*0-pulse at the relevant time instant.

The read output of the storage unit DS, before passage through the "multiply by 2" circuit 12, is available over lead 20 and may be fed through "and" gate 21 to the write input lead 202 of the accumulator A. The same output is also applied to a further "and" gate RG whose output is used as a triggering input to a trigger circuit TC3. This circuit TC3 is reset, if necessary, at the end of each scan beat by the Hs waveform (Fig. 14*d*) and has one of its outputs applied to the "and" gate 21 as a control therefor, such gate 21 being opened only when the circuit TC3 is in the triggered state.

The doubled output from the storage unit DS is available on lead 23 and is applied as a triggering input to a further trigger circuit TC4 which is reset, if necessary, at the end of each scan beat by the Hs waveform. One output from this trigger circuit is used as one controlling potential for the gate circuit RG while its opposite output is used as a similar control potential for a further "and" gate circuit 24. The trigger circuit TC4 is arranged so as to condition the gate RG to open and the gate 24 to close when in its untriggered state and to condition the gate 24 to open and the gate RG to close when in its triggered state.

The output from the main store MS is applied through a control gate circuit 25 to the gate circuit 24 and, if the latter is opened, passes therethrough to operate as a triggering input to a further trigger circuit TC5. This latter circuit is reset, if necessary, at the end of each scan beat by the Hs waveform and has one of its outputs applied as a controlling potential to an "and" gate 26 which is connected in the circuit by which the prepulses generated in the prepulse unit PPU are fed to the remainder of the machine. This gate circuit 26 is arranged to be open whenever the trigger circuit TC5 is in its reset or untriggered state and to be closed so as to inhibit the supply of prepulses whilst the trigger circuit TC5 is in its triggered state.

The main store output available through gate 25 is also applied as a second controlling input to the gate RG whereby any "1" digit signal in the main store output will condition the gate RG for opening.

The operation of the arrangement will now be described with reference also to the timing diagram of Fig. 1 and the chart of Fig. 2 using, as a practical example the simple numbers of 10101000—0 for the multiplicand D and 11001000—0 for the multiplier R. Upon the occurrence of the *s*, D instruction in Bar 0, the staticisor unit STU is set up to select the address of the multiplicand number D (10101000—0) in the main store MS and to condition the gate circuit 16 to open so that in the A2 beat for such Bar 0 the number D is written into the *a* line of the tube 10. Simultaneously the same number D is applied to the gate 19 where the presence of a "1" digit in the first or least significant position allows the coincident *p*0-pulse to pass and to trigger the trigger circuit TC1, thereby recording the fact that the multiplicand number had a "1" digit at such least significant position and conditioning the test unit TU so that it will, at the end of the multiplication operation, emit a +2 signal. If the multiplicand number D had not included a "1" digit at the least significant position the trigger circuit TC1 would not have been triggered and the test unit TU would have been conditioned to emit a +1 signal at the end of the multiplication operation.

As it is essential for the operation of the arrangement that the multiplicand number actually used should contain a "1" digit in its (initially) least significant position, the gate 17 is also opened during the A2 beat of this Bar 0 whereby the *p*0-pulse is superposed upon the signal being fed to the *a* line of the tube 10 and thus provides the requisite "1" digit if it was originally absent.

During the beats S1, A1 and S2 of the following Bar 1 (and the whole of any other bars which may intervene) the doubling circuit 12 is inoperative. The number D is then regenerated within the storage unit DS unchanged during action beats when the *a* line of the tube 10 is scanned. During beat S2 of Bar 1 the instruction *s*, R is set up on the staticisor unit STU and becomes effective at the commencement of beat A2 causing the doubling circuit 12 to become effective at this instant, and to remain so as long as the instruction *s*, R is operative.

During beat A2 the *s*, R instruction is obeyed for the first time, and the multiplier number R (11001000—0) is fed from the main store MS by way of the now-opened gate 25 to one input of the gate circuit RG, another input of which is fed with the read output (undelayed D) from the store DS. The trigger circuit TC4 is, initially, in its untriggered state and accordingly conditions the gate RG to open. The occurrence of a "1" digit in the least significant place of the multiplier number R in coincidence with the similar "1" digit of the multiplicand number D thus causes a digit signal to pass gate RG and trigger the trigger circuit TC3 which controls the gate 21 to permit the whole of the number D (10101000—0) to pass through to the accumulator A.

The trigger circuit TC4 is triggered by the delayed "1" digit of lowest significance appearing on lead 23 from the output of the doubling circuit 12 so that the gate circuit RG is only conditioned to open for the duration of the first digit in the version of the multiplicand number D which is read out from the store DS and only one digit of the multiplier number R is sampled at one time, i. e. during one beat. The coincident and sampled digits of the multiplicand and multiplier numbers are shown ringed in Fig. 2.

In the next and following action beats A3—$A_n$ the manner of operation is similar except that the "1" digit which was initially in the least significant position of the multiplicand number D becomes progressively delayed with reference to the continually reapplied and unaltered multiplier number R so that in the gate RG each successive digit of the latter is examined and the subsequent mode of operation adjusted accordingly. If the examined multiplier digit is a "1" then the circuit TC3 is triggered and the currently multiplied version of the multiplicand number D is fed to the accumulator A whereas if such examined digit is a "0" the circuit TC3 is not triggered and such particular version of the multiplicand number is withheld from the accumulator A as shown in Fig. 2.

Unless the original multiplicand number D was zero, the multiplication process must extend over further beats such as S3, A3, S4, A4—$S_{n-1}$,$A_{n-1}$, $S_n$, $A_n$ (Fig. 1) following beat A2, and the prepulse which would otherwise be given after beat A2 and also any further prepulses which might be given before multiplication is complete have to be suppressed as previously explained. Control of this suppression is exercised by the trigger circuit TC5 which has its triggering input supplied with the multiplier number R (11001000—0) by way of the gate 24 which is conditioned to open when the trigger circuit TC4 is triggered. During the said beat A2 therefore the whole of the multiplier number R except the first (least significant) digit (i. e. 1001000—0) will be fed to the triggering input of circuit TC5 and any "1" digit signal so fed will serve to trigger the circuit and thus cause the prepulse which would otherwise be released to be suppressed. During the following beat A3 and subsequent action beats during multiplication the digit position at which gate 24 is conditioned to open becomes progressively later, only those digits in the multiplier number R which have not yet been examined in the gate RG being passed to the circuit TC5. Prepulses will be suppressed and multiplication will thus continue until a point is reached at which all the "1" digits in the multiplier number R have been examined in gate RG and no "1" digit signals are fed to trigger the circuit TC5. The next prepulse which would normally be released in the machine will then be released and the machine will then proceed to the next operation.

Figures 1, 2:
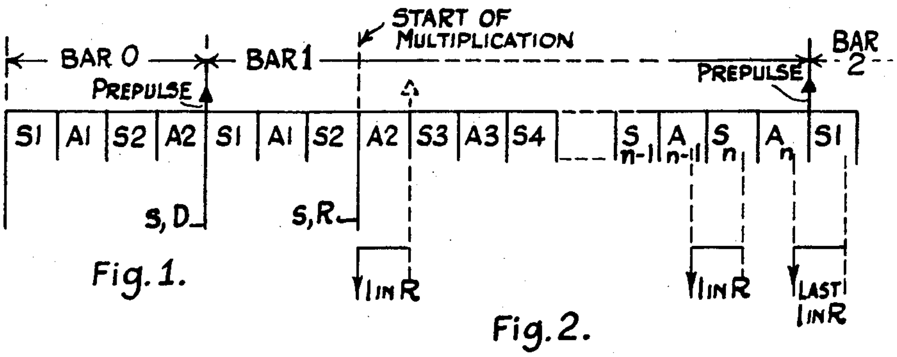

It is assumed in Fig. 1 that the next prepulse to be released will be at the commencement of the scan beat (S1) immediately following the action beat in which the last "1" digit in the multiplier number R is examined in gate RG and in which the trigger circuit TC5 remains untriggered for the first time. Obviously, if the prepulse generating circuits of unit PPU are such that prepulses only become available at 4-beat intervals then this prepulse might not have been available until two heats later. The prepulse released initiates a new bar, Bar 2 of Fig. 1, and it will be apparent that if the timing is as indicated in Fig. 1, the feeding of the final version of the multiplicand number D to the accumulator A (which occupies the whole or a portion of the scan beat following the action beat in which the last "1" digit in the multiplier number R is examined in gate RG) will overlap Bar 2. This does not matter however as during beat S1 of Bar 2, the machine cannot be performing any operations relating to Bar 2 which involve use of the multiplier or accumulator. During S1 beats the machine is merely performing the operations preliminary to the extraction of a new instruction.

The operation performed in Bar 2 will depend upon the condition of the trigger circuit TC1. If such circuit is in the triggered condition, indicative of a "1" in the least significant place of the original multiplicand number D, the number standing in the accumulator A will be the correct product and no correction will be required. The output control voltage from circuit TC1 under these conditions is therefore fed to control the +1 or +2 circuits of the test unit TU of the computing machine as described in said specification B so that the content of the control unit CL of the machine is increased by 2 during beat S1 of Bar 2 and one instruction in the list of instructions stored in the machine is omitted. If, on the other hand, the least significant digit of the original multiplicand number D had been "0" the sum standing in the accumulator A at the end of Bar 1 is too great and has to be corrected by the subtraction from it once of the multiplier number R. The untriggered condition of circuit TC1 which records such state of affairs causes only 1 to be added to the content of the control unit CL during beat S1 of Bar 2 so that an instruction $a-r$, A, which is specially inserted in the list of instructions when preparing the programme, is executed during that bar. The instruction $a-r$, A causes the multiplier number R to be read out of the main store MS and subtracted from the content $a$ of the accumulator A and the difference, $a-r$, which is the correct product of $R\times D$ to be written into the accumulator A.

Figure 4:
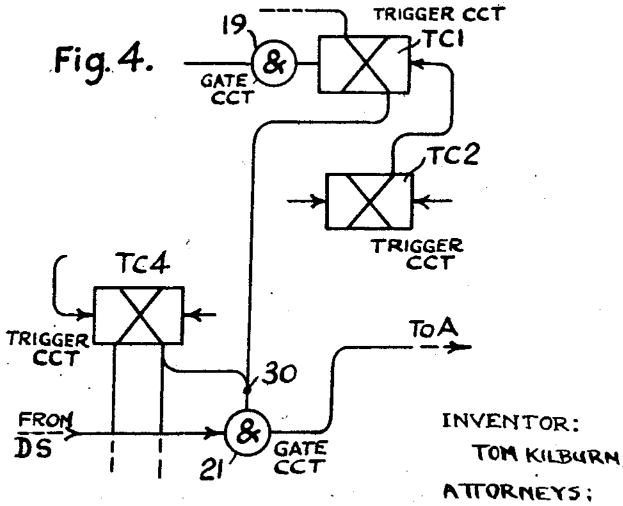

A modification of the arrangement so far described which obviates the necessity for the provision of the $a-r$, A instruction is shown in Fig. 4. In this modification the output from the trigger circuit TC1 now no longer influences the +1 or +2 circuits of the test unit TU and interference with the circuit of that unit is avoided. The gate 21 which feeds the multiplicand number D to the accumulator A is however provided with a further controlling connection which is fed with the output voltages, combined in a buffer or "or" gate 30, of the trigger circuits TC1 and TC4. The control voltage from circuit TC4 will open gate 21 to permit all digits in the multiplicand D except the first to pass, when the trigger circuit TC3 also conditions such gate 21 to open, while the control voltage from trigger circuit TC1, when that circuit is triggered, will condition the gate 21 to pass all the digits in the multiplicand D including the first. When circuit TC1 is not triggered, registering the fact that the first digit in the true multiplicand D is a "0," the gate 21 will be controlled by the voltage from circuit TC4 to prevent the first digit in the number D in the store DS (i. e. the added "1") being fed to the accumulator A whereas, when the circuit TC1 is triggered, its output voltage will over-ride the control voltage from circuit TC4 during the first digit period of each version of the multiplicand number D, due to the buffer connection 30 and will permit the true "1" digit in the first position in the number D to be fed to the accumulator A.

Various modifications may obviously be made in the arrangements actually described without departing from the scope of the invention. For example, the trigger circuit TC1 may be reset into the untriggered state at the end of beat S2 of Bar 0 by a waveform, such as the Halver waveform, which has a transition at the end of the beat and which is released to perform the retriggering operation by a gate controlled by the staticized $s$, D instruction.

I claim:

1. In an electronic digital computing machine of the type operating with binary numbers expressed dynamically in serial form as electric pulse signal trains and including a main storage device having a plurality of separate storage locations for both number and instruction data items, an accumulator including an arithmetical circuit for combining and storing number signals successively applied thereto, a control system for controlling the selection and transfer of number and instruction words within the machine, and timing means for controlling the operating rhythm of the machine as comprising a plurality of separate minor cycles or beats in a complete operative cycle or bar which is the time interval required to deal with one instruction, the provision of multiplying arrangements which comprise an auxiliary storage device including a regenerative loop having a read output terminal and a write-input terminal, a multiplying element interconnecting said terminals for altering the value of a regenerated signal by a factor of 2, a first two stable state trigger circuit having its triggering input supplied with the output signal from said multiplying element in said regenerative loop, a first coincidence gate circuit controlled by signals from said first trigger circuit and from said main storage device to be opened only when said trigger circuit is in its reset condition and the signals from said main storage device are representative of the digit value "1," a second trigger circuit having its triggering input supplied by way of said first gate circuit from the read output terminal of said auxiliary storage device, a second coincidence circuit controlled by signals from said second trigger circuit to be opened only when said second trigger circuit is in triggered condition, circuit means connecting the read output terminal of said auxiliary storage device to said accumulator through said second gate circuit and means for repeatedly resetting each of said trigger circuits to its reset condition at the end of each successive multiplication step defined by said control system.

2. An electronic digital computing machine according to claim 1 wherein said multiplying arrangements include a third coincidence gate circuit controlled by a signal from said first trigger circuit to be opened only when said first trigger circuit is in its triggered condition, a third trigger circuit having its triggering input supplied through said third gate circuit with signals from said main storage device, means for terminating the multiplying operation under the control of an applied potential and a circuit connection from said third trigger circuit to said terminating means for applying said control potential when said third is in its reset condition.

3. An electronic digital computing machine according to claim 2 wherein said multiplying arrangements include a fourth coincidence gate circuit controlled by a signal from said timing means to be opened only during the time of the first digit-interval of any beat period, a fourth trigger circuit having its triggering input supplied through said fourth gate circuit with the signal pulse train representing the multiplicand number applied to said auxiliary storage device, means in said timing means for altering the operation programme of the machine under the control of an applied control signal and a circuit connection from said fourth trigger circuit to said operation altering means to cause alteration of said operation programme if said fourth trigger circuit remains untriggered during a multiplying operation.

4. A multiplying arrangement for use in an electronic digital computing machine which operates with binary numbers whose "1" value digits are expressed dynamically in ascending power order as pulses of an electric pulse signal train, which comprises an accumulator device for effecting arithmetical combination of successive number-representing signals applied thereto, a separate number signal storage device for receiving the input multiplicand number-representing signal and reconstituting such multiplicand signal in dynamic form in unaltered form at the first step and at progressively doubled binary-value form at each subsequent one of the successive steps in the multiplication process, said input multiplicand signal having always a "1" value digit pulse in the position of lowest binary power significance of the pulse train, means for repeatedly supplying the multiplier number-representing signal in unaltered form once during each of said successive steps in the multiplication process, pulse coincidence detecting means providing an output signal in the event of pulse coincidence, circuit means for applying said multiplier signal and that part of said reconstituted multiplicand signal which precedes and which includes said lowest significant "1" digit pulse to said pulse coincidence detecting means once during each of said successive steps in the multiplication process and means controlled by the output signals from said pulse coincidence detecting means for applying said multiplicand signal at its then current reconstituted value to said accumulator device at each occurrence of an output signal from said pulse coincidence detecting means.

5. A multiplying arrangement in accordance with claim 4 which includes means for automatically inserting a "1" value digit pulse in the position of lowest binary power significance of the input multiplicand number-representing signal before its initial insertion into said separate number signal storage device.

6. A multiplying arrangement in accordance with claim 5 which includes pulse signal train examining means for examining the signal pulse content of said least significant position of the input multiplicand signal and answer correcting means controlled by said signal examining means for applying a correction to the final content of said accumulator device whenever said examined least significant digit signal position exhibits a binary "0" value content.

7. A multiplying arrangement in accordance with claim 6 in which said signal examining means comprises an electric trigger circuit which is set at the commencement of the multiplication process into one or the other of its alternative states in accordance with the presence or absence of a binary "1" valve pulse in the lowest significance position of the input multiplicand signal.

8. A multiplying arrangement in accordance with claim 7 which includes means for deriving alternative control potentials from said trigger circuit and in which said answer correcting means comprises machine operation modifying means controlled by said control potentials for causing the machine to complete the multiplying operation by way of a subsequent instruction by which the multiplier number is subtracted from the number represented by the signal in said accumulator device when said examined least significant digit of said input multiplicand signal was of binary value "0."

9. A multiplying arrangement in accordance with claim 7 which includes means for deriving alternative control potentials from said trigger circuit and in which said answer correcting means comprises signal blocking means controlled by said alternative control potentials for inhibiting access of the inserted "1" digit signal in the least significant position of the multiplicand signal to said accumulator device at each application of said reconstituted multiplicand signal from said separate number signal storage device to said accumulator.

10. A multiplying arrangement in accordance with claim 4 which includes operation terminating means for terminating the multiplying operation immediately subsequent to that step of the succession of steps in which the "1" value digit pulse of greatest significance existing in the multiplier signal has coincided in said pulse coincidence detecting means with said lowest significant "1" value digit pulse in said reconstituted multiplicand signal, said operation terminating means comprising an electric trigger circuit, means for resetting said trigger circuit at the beginning of each of said successive steps, means for deriving a control potential from said trigger circuit when in its triggered state, means for examining at each of said successive steps all of the multiplier signal following the digit signal which coincides with said least significant "1" digit pulse in said pulse coincidence detecting means, means for utilising any "1" value digit pulse in said examined signal portion of said multiplier signal as a triggering medium for said trigger circuit and operation-step repeat control means controlled by said control potential to cause a further multiplying operation step whenever said control potential is present.

11. A multiplying arrangement in accordance with claim 4 in which said separate storage device comprises an electrostatic store of the cathode ray tube type having a value-doubling circuit included within its regenerative loop, said value-doubling circuit including signal controlled switching means whereby its operation may be suspended and replaced by direct signal regeneration at unaltered value under the influence of an external control signal.

12. In an electronic digital computing machine of the type operating with binary numbers whose binary "1" value digits are expressed dynamically in ascending binary power order as pulses in serial form electric pulse signal trains and including an accumulator having adding means for determining the sum of a plurality of successively applied numbers each expressed as an electric pulse signal train and timing means for controlling the operating rhythm as a series of minor cycles or beats each of a length suited to the dynamic expression of a number of predetermined digit-length, the provision of means for effecting multiplication of two binary numbers each represented as signal pulse trains and comprising a storage device having read out and write in terminals and including a regenerative loop between such read out and write in terminals for receiving the electric signal representation of the input multiplicand number, and for repeatedly reconstituting the stored number as an externally available pulse signal train in times relation to said beat intervals of the machine rhythm, said input multiplicand number signal having always a "1" value digit pulse in the position of lowest binary power significance, said regenerative loop including a value-doubling circuit for effectively increasing the binary value of the stored multiplicand number signal by a factor of two after each reconstitution, a repetitively operative source of electric pulse signal trains each representative of the multiplier number, said repetitive multiplier signals being in a constant and predetermined timing relationship to said beat intervals of the machine rhythm, a gate circuit, said gate circuit being normally closed to inhibit passage of any signal therethrough and controlled to open by application of a suitable control potential, circuit connections including said gate circuit between said read out terminal of said storage device and said accumulator, pulse signal coincidence detecting means connected to said read out terminal of said storage device and said source of multiplier signals for comparing the digit signals of said reconstituted multiplicand signal up to and including said least-significant "1" representing digit signal with the correspondingly timed digit-representing signals of said multiplier signal once after each reconstituting of said stored multiplicand signal, said pulse coincidence detecting means providing a control potential upon the coincidence of a "1" digit representing signal in said multiplier number signal with said least significant "1" representing digit signal in said multiplicand number signal and circuit means for applying said control potential to cause opening of said gate to allow passage of the multiplicand number representing signal to said accumulator at the particular multiplied value thereof effective at that beat interval.

References Cited in the file of this patent

UNITED STATES PATENTS

| | | |
|---|---|---|
| 2,404,047 | Flory | July 16, 1946 |
| 2,409,689 | Morton | Oct. 22, 1946 |
| 2,596,741 | Tyler | May 13, 1952 |
| 2,604,262 | Phelps | July 22, 1952 |

OTHER REFERENCES

Progress Report #2 on the EDVAC, Moore School Engineering, Univ. of Pa., chapter III (pages 3–1 to 3–10; pages 1–2–11 to 1–2–13, 1–2–17 to 1–2–21, 1–4–1 and 1–4–2); Figures PY–O–114, PY–O–118, PY–O–119, PY–O–180 and PY–O–212. Declassified Feb. 13, 1947.

"Description of Serial Acoustic Binary EDVAC," by T. K. Sharpless, lecture 47 from "Theory and Techniques for Design of Electronic Digital Computers," vol. IV, Univ. of Pa. (pages 47–1 to 47–12; Figures PY–O–219, MS–119–1, and 47–15), June 30, 1948.

"A Functional Description of the EDVAC," Moore School of Electrical Engineering, Univ. of Pa., Nov. 1, 1949, vol. II (Fig. 104–10LD–6).

"A Functional Description of the EDVAC," Moore School of Electrical Engineering, Univ. of Pa., Nov. 1, 1949 (pp. 4–18 to 4–22*a* and Fig. 104–3LD–2).